(12) United States Patent
Park et al.

(10) Patent No.: US 12,555,891 B2
(45) Date of Patent: Feb. 17, 2026

(54) ANTENNA STRUCTURE AND ELECTRONIC DEVICE INCLUDING THE SAME

(71) Applicant: Samsung Electronics Co., Ltd., Suwon-si (KR)

(72) Inventors: Kwangbok Park, Suwon-si (KR); Jaeho Lee, Suwon-si (KR); Yonghun Ji, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 245 days.

(21) Appl. No.: 18/347,824

(22) Filed: Jul. 6, 2023

(65) Prior Publication Data

US 2024/0014543 A1 Jan. 11, 2024

Related U.S. Application Data

(63) Continuation of application No. PCT/KR2023/009524, filed on Jul. 5, 2023.

(30) Foreign Application Priority Data

Jul. 7, 2022 (KR) .................. 10-2022-0083550
Aug. 12, 2022 (KR) .................. 10-2022-0101511

(51) Int. Cl.
 *H01Q 1/22* (2006.01)
 *G06F 1/16* (2006.01)
 *H05K 7/14* (2006.01)
(52) U.S. Cl.
 CPC ......... *H01Q 1/2266* (2013.01); *G06F 1/1662* (2013.01); *H05K 7/1427* (2013.01)

(58) Field of Classification Search
 CPC ........ G06F 1/16; G06F 1/1662; G06F 1/1698; H01Q 1/2266; H01Q 21/29; H01Q 9/42; H05K 7/1427
 See application file for complete search history.

(56) References Cited

U.S. PATENT DOCUMENTS

2003/0080944 A1  5/2003  Takahashi et al.
2006/0187129 A1  8/2006  Hirota
(Continued)

FOREIGN PATENT DOCUMENTS

CN    201282054 Y    7/2009
CN    214202307 U    9/2021
(Continued)

OTHER PUBLICATIONS

International Search Report dated Oct. 11, 2023, issued in International Patent Application No. PCT/KR2023/009524.
(Continued)

*Primary Examiner* — Thien M Le
(74) *Attorney, Agent, or Firm* — Jefferson IP Law, LLP

(57) ABSTRACT

According to an embodiment of the disclosure, an electronic device may comprise: a housing including a conductive portion, a plurality of non-conductive portions, and a plurality of openings, a plurality of keyboard key caps exposed through the plurality of openings of the housing, an antenna, and a circuit board disposed inside the housing and electrically connected to the antenna. At least one of the plurality of openings may be defined by the conductive portion, the plurality of the non-conductive portions, and the antenna.

20 Claims, 15 Drawing Sheets

(56) References Cited

U.S. PATENT DOCUMENTS

| | | | |
|---|---|---|---|
| 2010/0073242 A1* | 3/2010 | Ayala Vazquez | H01Q 5/371 |
| | | | 343/702 |
| 2012/0075189 A1 | 3/2012 | Hsu et al. | |
| 2012/0146817 A1 | 6/2012 | Tang et al. | |
| 2013/0009833 A1* | 1/2013 | Kough | H01Q 13/10 |
| | | | 343/770 |
| 2014/0086441 A1* | 3/2014 | Zhu | H01Q 7/00 |
| | | | 343/866 |
| 2014/0092543 A1 | 4/2014 | Yang et al. | |
| 2014/0132461 A1 | 5/2014 | Kim et al. | |
| 2015/0280310 A1 | 10/2015 | Lee | |
| 2017/0212554 A1 | 7/2017 | Guterman et al. | |
| 2018/0113493 A1* | 4/2018 | Silvanto | E05D 11/0054 |
| 2018/0342789 A1* | 11/2018 | Jiang | H01Q 1/528 |
| 2019/0237848 A1 | 8/2019 | Ramasamy et al. | |
| 2020/0091608 A1* | 3/2020 | Alpman | H03L 7/145 |
| 2020/0310495 A1* | 10/2020 | Kuna | G06F 1/1698 |
| 2021/0208637 A1 | 7/2021 | Liu et al. | |
| 2021/0242567 A1 | 8/2021 | Wang et al. | |
| 2022/0200123 A1* | 6/2022 | Thakur | G06F 1/1681 |
| 2023/0101668 A1* | 3/2023 | Oh | H01Q 13/103 |
| | | | 343/702 |
| 2023/0350467 A1* | 11/2023 | Chang | G06F 1/1681 |

FOREIGN PATENT DOCUMENTS

| | | |
|---|---|---|
| KR | 10-2014-0062896 A | 5/2014 |
| KR | 10-2017-0089775 A | 8/2017 |

OTHER PUBLICATIONS

European Search Report dated May 26, 2025, issued in European Application No. 23835840.2.

* cited by examiner

ANTENNA STRUCTURE AND ELECTRONIC DEVICE INCLUDING THE SAME

CROSS-REFERENCE TO RELATED APPLICATION(S)

This application is a continuation application, claiming priority under § 365(c), of an International application No. PCT/KR2023/009524, filed on Jul. 5, 2023, which is based on and claims the benefit of a Korean patent application number 10-2022-0083550, filed on Jul. 7, 2022, in the Korean Intellectual Property Office, and of a Korean patent application number 10-2022-0101511, filed on Aug. 12, 2022, in the Korean Intellectual Property Office, the disclosure of each of which is incorporated by reference herein in its entirety.

TECHNICAL FIELD

The disclosure relates to an electronic device. More particularly, the disclosure relates to an antenna structure and an electronic device including the same.

BACKGROUND ART

Owing to the remarkable development of information and communication technology and semiconductor technology, various electronic devices have been increasingly proliferated and used. Especially, electronic devices are under development for use in communication while being carried.

An electronic device may refer to a device performing a specific function according to a loaded program, such as a home appliance, an electronic notebook, a portable multimedia player, a mobile communication terminal, a tablet personal computer (PC), a video/audio device, a desktop/laptop computer, or a vehicle navigation device. For example, these electronic devices may output stored information as sound or an image. As the integration level of electronic devices increases and ultra-high-speed, large-capacity wireless communication becomes commonplace, a single electronic device, such as a mobile communication terminal may be equipped with various functions. For example, not only a communication function but also an entertainment function, such as games, a multimedia function, such as music/video playback, a communication and security function, such as mobile banking, schedule management, and an electronic wallet function are integrated into one electronic device. Such electronic devices are miniaturized so that users may conveniently carry them.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an antenna structure and an electronic device including the same.

Additional aspects will be set forth in part in the description which follows and, in part, will be apparent from the description, or may be learned by practice of the presented embodiments.

In accordance with an aspect of the disclosure, an electronic device may comprise: a housing including a conductive portion, a plurality of non-conductive portions, and a plurality of openings, a plurality of keyboard key caps exposed through the plurality of openings of the housing, an antenna, and a circuit board disposed inside the housing and electrically connected to the antenna. At least one of the plurality of openings may be defined by the conductive portion, the plurality of the non-conductive portions, and the antenna.

In accordance with an aspect of the disclosure, an electronic device may comprise: a first housing including a conductive portion, at least one non-conductive portion disposed in the conductive portion, and a plurality of openings, a second housing rotatably connected to the first housing, a plurality of keyboard key caps exposed through the plurality of openings of the first housing, an antenna disposed in the first housing, a display disposed on the second housing and a circuit board disposed inside the first housing and electrically connected to the antenna. The antenna may be separated from the conductive portion by the at least one non-conductive portion.

In accordance with an aspect of the disclosure, an electronic device is provided. The electronic device includes a housing formed of a metal material, a plurality of keyboard key caps disposed on at least part of the housing, a printed circuit board disposed inside the housing, a non-conductive portion disposed between some of the plurality of keyboard key caps and connected to the housing, and an antenna electrically connected to the printed circuit board, at least partially connected to the non-conductive portion, and spaced apart from at least part of the housing. Various other embodiments are available.

In accordance with another aspect of the disclosure, an electronic device is provided. The electronic device includes a first housing, a second housing rotatably connected to the first housing, a display disposed on the second housing, a plurality of keyboard key caps disposed on at least part of the first housing, a printed circuit board disposed inside the first housing, a non-conductive portion disposed between some of the plurality of keyboard key caps and connected to the first housing, and an antenna electrically connected to the printed circuit board, at least partially connected to the non-conductive portion, and spaced apart from the first housing.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
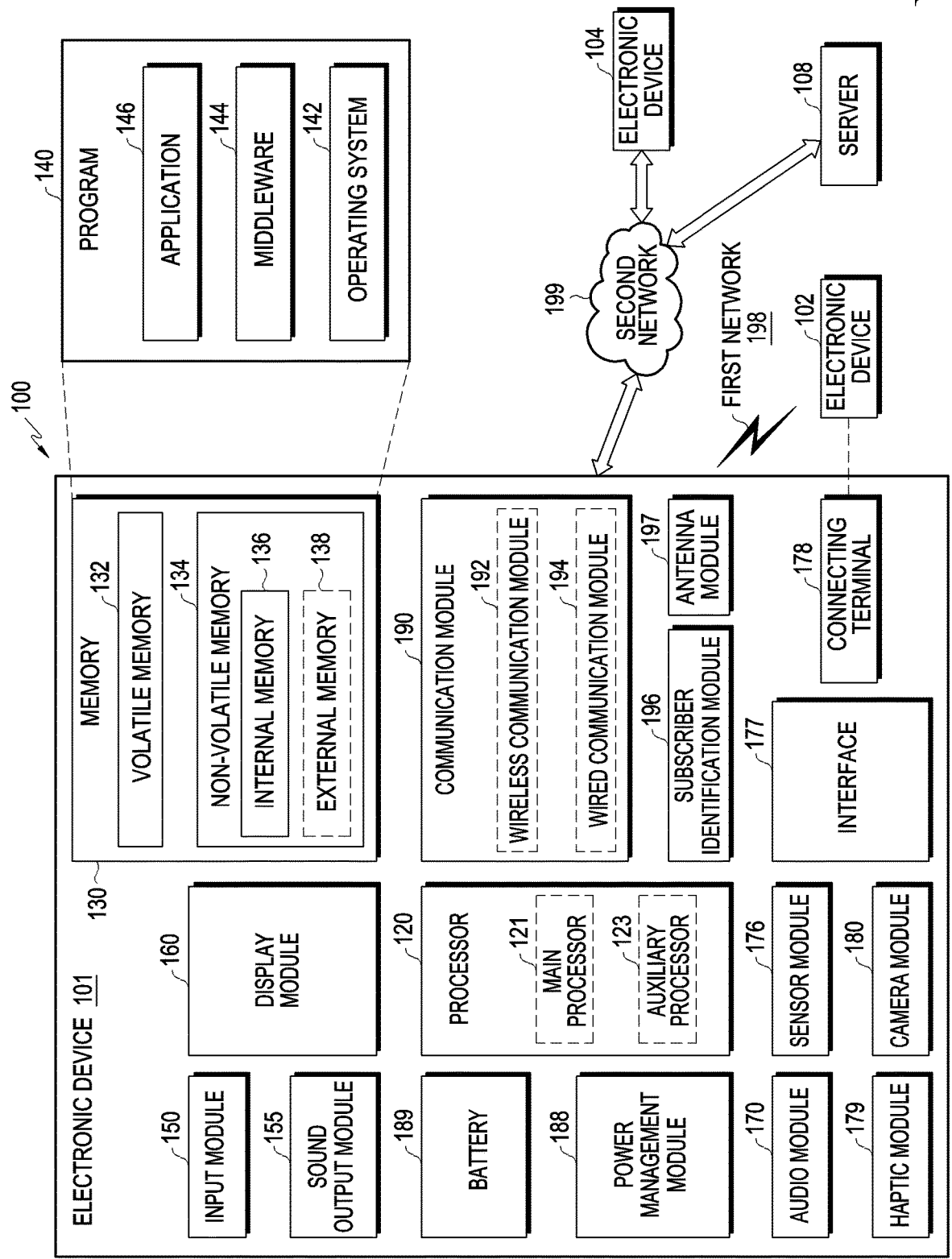
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibel (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Hereinafter, for convenience of description, in FIGS. 2 to 13, a spatial coordinate system including an X-axis, a Y-axis, or a Z-axis is illustrated. The X-axis direction, the Y-axis direction, or the Z-axis direction is defined or described based on the first housing 212, but is not limited thereto. The X-axis direction of FIGS. 2 to 13 may be defined in the direction of the width direction of the first housing 212, or in parallel to the folding axis Ax. The Y-axis direction of FIGS. 2 to 13 may be defined in the longitudinal direction of the first housing 212, or in a perpendicular with the folding axis Ax. The Z-axis direction of FIGS. 2 to 13 may be defined in the thickness direction of the first housing 212, in the height direction of the first housing 212, or in a perpendicular with the folding axis Ax.

Figure 2:
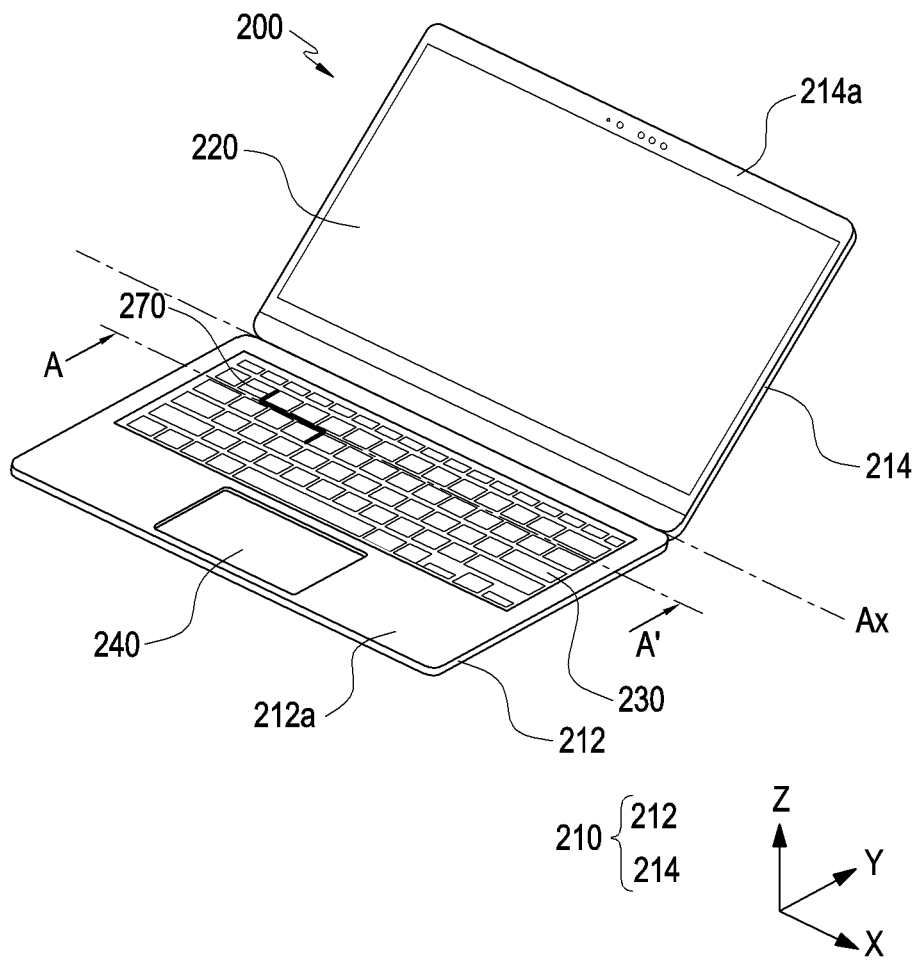
FIG. 2 is a perspective view illustrating an electronic device according to an embodiment of the disclosure.

FIG. 2 is a perspective view illustrating an electronic device according to an embodiment of the disclosure.

Referring to FIG. 2, an electronic device 200 (e.g., the electronic device 101 of FIG. 1) may include a housing 210, a display 220, a plurality of keyboard key caps 230, a touch pad module 240, and an antenna 270. According to an embodiment, the electronic device 200 may be a laptop computer, a notebook computer, or a portable terminal. The configurations of the electronic device 200, the display 220, and the antenna 270 of FIG. 2 may be partially or wholly identical to those of the electronic device 101, the display module 160, and the antenna module 197 of FIG. 1. The configuration of the plurality of keyboard key caps 230 of FIG. 2 may be partially or wholly identical to that of the input module 150 of FIG. 1. The configuration of the touch pad module 240 of FIG. 2 may be partially or wholly identical to that of the input module 150 of FIG. 1. The embodiment of FIG. 2 may be combined with the embodiment of FIG. 1 or the embodiments of FIGS. 3a to 13. For example, the embodiment of FIG. 2 may additionally include components of the embodiment of FIG. 1.

According to an embodiment, the housing 210 may form at least part of the exterior of the electronic device 200 or support a component (e.g., the touch pad module 240) of the electronic device 200. According to an embodiment, the housing 210 may be formed of a metal material. According to an embodiment, the housing 210 may be defined and referred to as a metal housing. According to an embodiment, the housing 210 may include a metal area.

According to an embodiment, the housing 210 may accommodate at least one of the display 220, the plurality of keyboard key caps 230, or the touch pad module 240.

According to an embodiment, the electronic device 200 may be opened or closed. For example, the housing 210 may include a first housing 212 and a second housing 214 rotatably connected to the first housing 212. According to an embodiment, the electronic device 200 may include a hinge module connected to the housing 210. For example, the hinge module may be connected to the first housing 212 and the second housing 214 and provide a structure that allows the first housing 212 and the second housing 214 to be rotatable relative to each other. For example, the first housing 212 and the second housing 214 may provide a relatively rotatable structure for each other, based on the folding axis Ax of the hinge module. According to an embodiment, the first housing 212 may be configured to rotate with respect to the second housing 214 at a specified angle (e.g., 0 degrees to 180 degrees or 0 degrees to 360 degrees). According to an embodiment, it may be defined and interpreted as rotation of the second housing 214 with respect to the first housing 212 at the specified angle. For example, a first front surface 212a of the first housing 212 may face a second front surface 214a of the second housing 214 (e.g., a closed state of the electronic device 200).

According to an embodiment, the housing 210 may be formed of a metal material having a selected rigidity. According to an embodiment, the housing 210 may be formed of a metal material or non-metal material having a selected rigidity. According to an embodiment, at least part of the housing 310 formed of the metal material may provide a ground plane and be electrically connected to a ground line formed on a printed circuit. For example, the housing 210 may be electrically connected to the printed circuit board through a capacitive component.

According to an embodiment, at least part of the display 220 may be disposed inside the second housing 214. For example, at least part of the display 220 may be visually exposed to the outside of the electronic device 200 through the second housing 214. According to an embodiment, the display 220 may be a flexible display deformable into a flat or curved surface in at least a partial area thereof. For example, the display 220 may be a foldable or rollable display.

According to an embodiment, the display 220 may be combined with or disposed adjacent to a touch sensing circuit, a pressure sensor capable of measuring the intensity (pressure) of a touch, and/or a digitizer configured to detect a magnetic field-type stylus pen.

According to an embodiment, each of the plurality of keyboard key caps 230 may detect a user input (e.g., pressure). According to an embodiment, the plurality of keyboard key caps 230 may be disposed on the first housing 212. According to an embodiment, in the state where the electronic device 200 is closed, the plurality of keyboard key caps 230 may face the display 220. According to an embodiment, the plurality of keyboard key caps 230 may be defined and interpreted as a plurality of keyboard keycaps. The configuration of the plurality of keyboard key caps 230 of FIG. 2 may be wholly or partially identical to that of the input module 150 of FIG. 1. The plurality of keyboard key caps 230 may be defined and/or referred to as a plurality of keyboard key buttons.

According to an embodiment, the touch pad module 240 may be configured to detect or receive a user input. According to an embodiment, the touch pad module 240 may include a capacitive touch sensor, a touch sensor based on resistive sensing, an optical touch sensor, or a surface acoustic wave touch sensor. For example, the touch pad module 240 may detect current, pressure, light, and/or vibration caused by an input applied to the touch pad module 240 by a user, and a processor (e.g., the processor 120 of FIG. 1) and/or the touch pad module 240 may determine user input based on a change in the detected current, pressure, light, and/or vibration.

According to an embodiment, the processor 120 and/or the touch pad module 240 may determine the position (e.g., XY coordinates) of the user input. According to an embodiment, the touch pad module 240 may detect pressure on the touch pad module 240. According to an embodiment, when an external object (e.g., the user's finger or a stylus pen) directly contacts or approaches a surface of the touch pad module 240, the touch pad module 240 may detect the external object.

According to an embodiment, the touch pad module 240 may be accommodated in the housing 210. For example, the touch pad module 240 may be connected to the first housing 212, and at least part of the touch pad module 240 may be exposed to the outside of the first housing 212. According to an embodiment, the touch pad module 240 may be adjacent to the plurality of keyboard key caps 230. According to an embodiment, in the state where the electronic device 200 is closed, at least part of the touch pad module 240 may face the display 220. The configuration of the touch pad module 240 may be wholly or partially identical to that of the input module 150 of FIG. 1.

According to an embodiment, the electronic device 200 may include the antenna 270 disposed between the plurality of keyboard key caps 230. According to an embodiment, the antenna 270 may be disposed between some of the plurality of keyboard key caps 230. According to an embodiment, at least part of the antenna 270 may be electrically connected to the circuit board (e.g., a PCB). According to an embodiment, the antenna 270 may be spaced apart from the housing 210 (e.g., the first housing 212). For example, the antenna 270 may be used as an antenna radiator. The configuration of the antenna 270 of FIG. 2 may be partially or wholly identical to that of the antenna module 197 of FIG. 1. The antenna 270 may be defined and/or referred as to an antenna radiator, an antenna structure, an antenna module, an antenna device, or an antenna element.

According to an embodiment, the antenna 270 may be disposed to be exposed to the outside of the first housing 212.

Figure 3A:
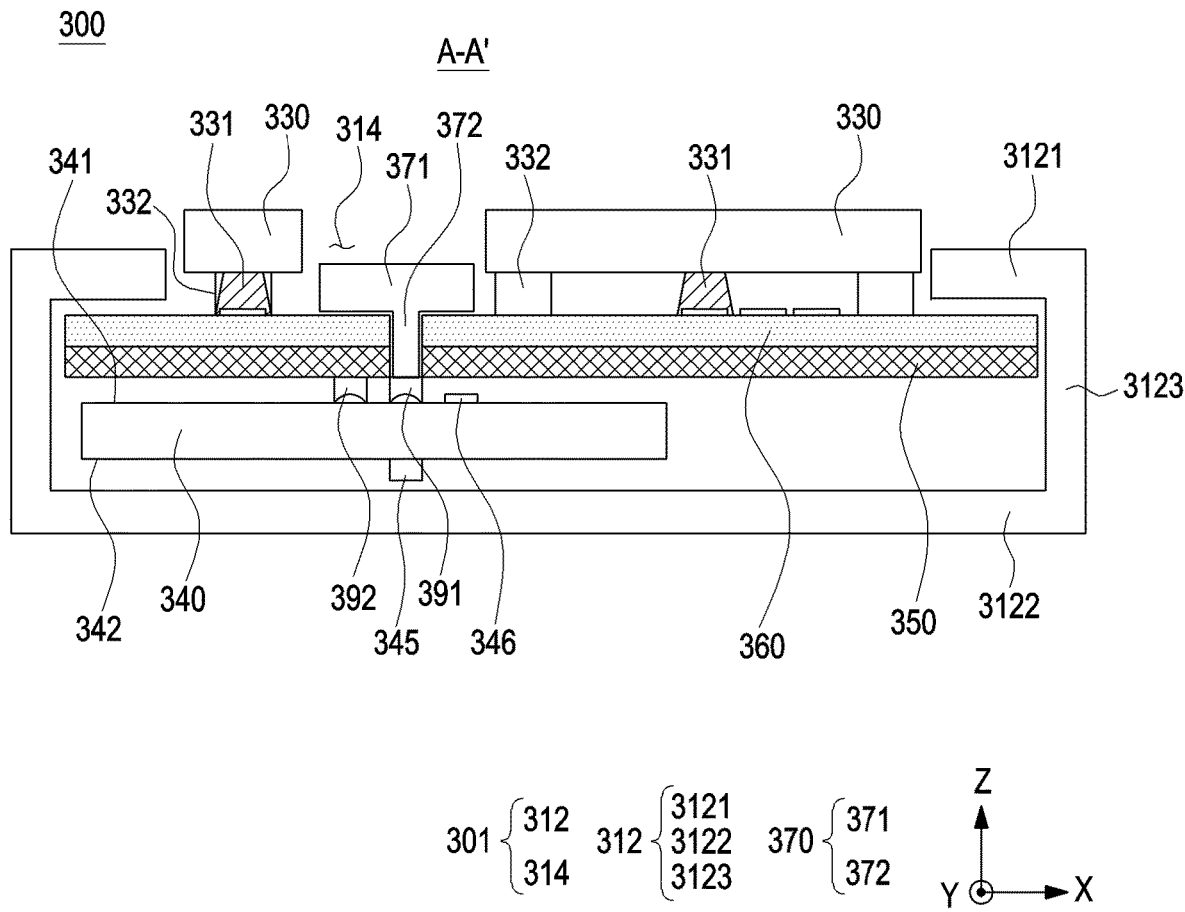
FIG. 3A is a sectional view illustrating an electronic device according to an embodiment of the disclosure.

FIG. 3A is a diagram illustrating a cross-section of an electronic device according to an embodiment of the disclosure. FIG. 3A is a sectional view taken along line A-A' of FIG. 2 according to an embodiment of the disclosure.

Figure 3B:
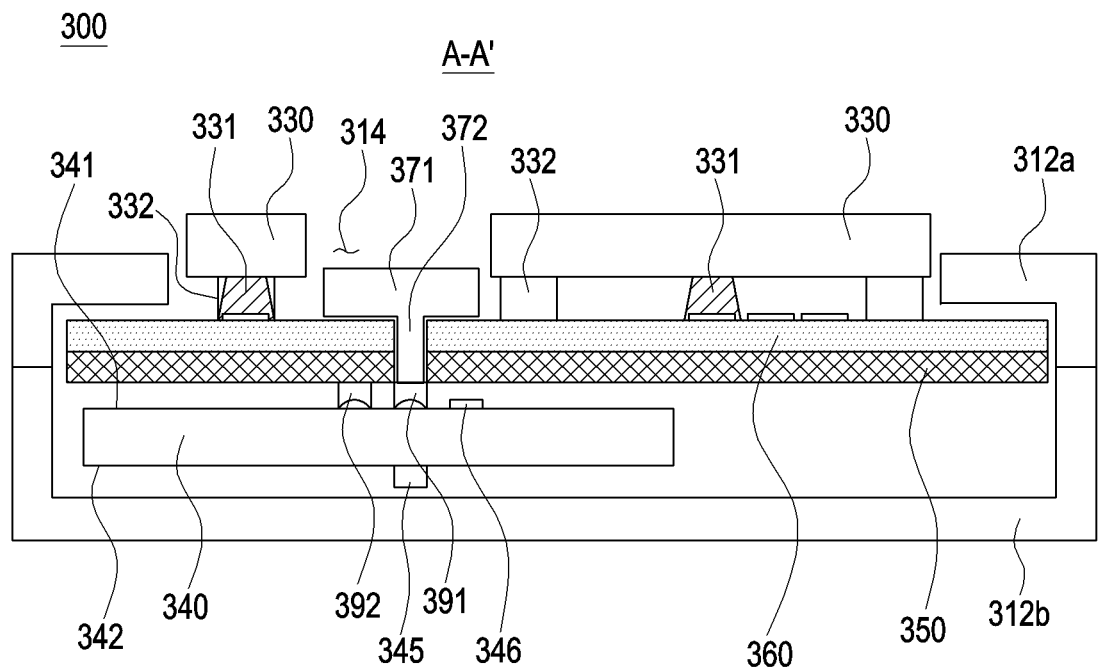
FIG. 3B is a sectional view illustrating an electronic device according to an embodiment of the disclosure.

FIG. 3B is a diagram illustrating a cross-section of an electronic device according to an embodiment of the disclosure. FIG. 3B is a sectional view taken along line A-A' of FIG. 2 according to an embodiment of the disclosure.

Referring to FIGS. 3A to 3B, an electronic device 300 (e.g., the electronic device 101 of FIG. 1 or the electronic device 200 of FIG. 2) may include a first housing 301, a plurality of keyboard key caps 330, a circuit board 340, a plate 350, a flexible printed circuit board 360, an antenna 370, and at least one connection member 391 and 392.

The configuration of the electronic device 300 of FIGS. 3A to 3B may be partially or wholly identical to that of the electronic device 101 of FIG. 1 or the electronic device 200 of FIG. 2. The configurations of the first housing 301, the plurality of keyboard key caps 330, and the antenna 370 of FIG. 3 may be partially or wholly identical to those of the first housing 212, the plurality of keyboard key caps 230, and the antenna 270 of FIG. 2. The embodiment of FIGS. 3A to 3B may be combined with the embodiments of FIGS. 1 and 2 or the embodiments of FIGS. 4 to 13.

According to an embodiment, the first housing 301 may form at least part of the exterior of the electronic device 300. According to an embodiment, the first housing 301 may have an internal space, and various electric components (e.g., the circuit board 340) may be disposed in the internal space.

According to an embodiment, the first housing 301 may include a cover member 312, and a plurality of openings 314.

According to an embodiment, the cover member 312 may be formed of a metal material. According to an embodiment, the cover member 312 may be defined and interpreted as at least partially formed as a metal area. The cover member 312 may form an overall appearance of the first housing 301. The cover member 312 may be defined and/or referred to as a metal portion, a metal area, a conductive portion, a conductive area, a cover, a frame, or a case. The cover member may have the internal space, and various electric components may be disposed in the internal space.

According to an embodiment, the plurality of openings 314 may be a plurality of holes formed in one surface of the cover member 312. The plurality of keyboard key caps 330 may be disposed in the plurality of openings 314.

According to an embodiment, the plurality of keyboard key caps 330 may be exposed to the outside of the first housing 301 through the plurality of openings 314.

According to an embodiment, the circuit board 340 (e.g., PCB (printed circuit board)) may be disposed inside the first housing 301.

Referring to FIG. 3A, the cover member 312 may include an upper wall 3121, a lower wall 3122, and a side wall 3123. The plurality of openings 314 may be formed in the upper wall 3121. The upper wall 3121 may form an upper surface of the first housing 301, and may be configured to face the second housing (e.g., the second housing 214 of FIG. 2). The lower wall 3122 may form a lower surface of the first housing 301. The side wall 3123 may connect the upper wall 3121 and the lower wall 3122, and may form a side surface of the first housing 301. The upper wall 3121, the lower wall 3122, and the sidewall 3123 may be integrally formed. The circuit board 340 may be disposed inside the cover member 312. The lower wall 3122 of the cover member 301 may face an opposite direction to the upper wall 3121 of the cover member 301 and may be substantially parallel to the upper wall 3122. According to an embodiment, a thickness direction of the first housing 301 (e.g., the Z-axis direction of FIG. 3A) is a direction from the upper wall 3121 to the lower wall 3122 or a direction from the lower wall 3122 to the upper wall 3121.

Referring to FIG. 3B, the cover member 312 may include an upper cover member 312a and a lower cover member 312b. The plurality of openings 314 may be formed in the upper cover member 312a. The upper cover member 312a may be coupled to the lower cover member 312b. The upper cover member 312a may form an upper surface of the first housing 301 and may be configured to face the second housing (e.g., the second housing 214 of FIG. 2). The upper cover member 312a may form a part of a side surface of the first housing 301. The lower cover member 312b may form a lower surface of the first housing 301. The lower cover member 312b may form the rest of the side surface of the first housing 301. The circuit board 340 may be disposed in an internal space formed by combining the upper cover member 312a and the lower cover member 312b. The circuit board 340 may be disposed below the upper cover member 312a and may be disposed above the lower cover member 312b. According to an embodiment, a thickness direction of the first housing 301 (e.g., the Z-axis direction of FIG. 3B) is a direction from the upper cover member 312a to the lower cover member 312b or a direction from the lower cover member 312b to the upper cover member 312a.

Referring to FIGS. 3A and 3B, the circuit board 340 (e.g., a PCB) may be disposed inside the first housing 301. According to an embodiment, a processor (e.g., the processor 120 of FIG. 1), a memory (e.g., the memory 130 of FIG. 1), a communication module 345 (e.g., the communication module 190 of FIG. 1) a tuning component 346 or an interface (e.g., the interface 177 of FIG. 1) may be mounted or disposed on the circuit board 340. According to an embodiment, the antenna 370 may be electrically connected to the communication module (e.g., the communication module 190 of FIG. 1).

According to an embodiment, the plate 350 may be disposed inside the first housing 301. According to an embodiment, the plate 350 may be defined and interpreted as a keyboard plate. According to an embodiment, the plate 350 may be fixed to or coupled with at least part of the cover member 312. According to an embodiment, the plate 350 may be formed of a metal material, and at least part of the plate 350 may support the flexible printed circuit board 360.

According to an embodiment, the plurality of keyboard key caps 330 may be electrically connected to the flexible printed circuit board 360 through contact terminals 331. According to an embodiment, the plurality of keyboard key caps 330 may descend according to a user input or pressing pressure, and a plurality of contact terminals 331 connected to the plurality of keyboard key caps 330, respectively may convert the user input or the pressing pressure into an electrical signal and transmit the electrical signal to the flexible PCB (FPCB) 360. For example, the plurality of keyboard key caps 330 and contact terminals 331 may provide the user input or the pressing pressure as input information. According to an embodiment, the electrical signal generated by the contact terminals 331 may be transmitted to the circuit board 340 through the flexible printed circuit board 360. According to an embodiment, the plurality of keyboard key caps 330 may be connected to elastic support members 332, so that when the user input or the pressing pressure is released, the plurality of keyboard key caps 330 may rise by the elastic support members 332.

According to an embodiment, at least part of the flexible printed circuit board 360 (e.g., FPCB) may be supported by the plate 350. According to an embodiment, the flexible printed circuit board 360 may be electrically connected to the contact terminals 331 connected to the plurality of keyboard key caps 330. According to an embodiment, the flexible printed circuit board 360 may be electrically connected to the circuit board 340. For example, the flexible printed circuit board 360 may be connected to the circuit board 340 directly or indirectly through a connector, such as a board-to-board (B2B) connector or a separate connection member, such as a pogo pin.

According to an embodiment, at least part of the antenna 370 may be disposed between some of the plurality of keyboard key caps 330. According to an embodiment, the antenna 370 may be formed of a metal material and used as an antenna radiator for an antenna signal. According to an embodiment, at least part of the antenna 370 may be electrically connected to the circuit board 340.

According to an embodiment, the antenna 370 may include a first antenna portion 371 or a second antenna portion 372. The first antenna portion 371 may be disposed between some keyboard key caps among the plurality of keyboard key caps 330. The second antenna portion 372 may be extended from the first antenna portion 371. At least a portion of the second antenna portion 372 may be disposed inside the first housing 301.

According to an embodiment, the second antenna portion 372 may be electrically connected to the circuit board 340 through the first connection member 391. According to an embodiment, the second antenna portion 372 may be disposed in a hole of the plate 350 and a hole of the flexible printed circuit board 350. An end of the second antenna portion 372 may be electrically connected to the first connection member 391.

According to an embodiment, the at least part of the antenna 370 may be electrically connected to the circuit board 340 through a first connection member 391. For example, the second antenna portion 372 may be electrically connected to the circuit board 340 through the first connection member 391. According to an embodiment, the at least part of the antenna 370 may be disposed to pass through the plate 350 and the flexible printed circuit board 360, and may be electrically connected to the circuit board 340 using the first connection member 391. For example, the antenna 370 may be electrically connected to the first connection member 391 through a hole formed in the plate 350 and a hole formed in the flexible printed circuit board 360. According to an embodiment, the circuit board 340 may be connected to the antenna 370 using the first connection member 391, for antenna signal feeding. According to an embodiment, the first connection member 391 may include a c-clip, a flexible printed circuit board, or a coaxial cable. According to an embodiment, the first connection member 391 is not limited to the above, and may include various means for connecting the antenna 370 and the circuit board 340 to each other. The first connection member 391 may be defined and/or referred as to a first conducive member, a first connector, a conductive path, or a first metal member.

According to an embodiment, part of the antenna 370 other than the at least part thereof may be electrically connected to the circuit board 340 using the second connection member 392. For example, the first antenna portion 371 may be electrically connected to the circuit board 340 through the second connection member 392. At least part of the circuit board 340 may form a ground plane, and may be electrically connected to the ground plane of the circuit board 340 using the second connection member 392. According to an embodiment, the first housing 310 may be formed of a metal material or a non-metal material, and at least part of the first housing 301 formed of the metal material may provide a ground plane. According to an embodiment, the antenna 370 may be electrically connected to the ground plane of the first housing 310 through a ground line formed on the circuit board 340. According to an embodiment, the part of the antenna 370 other than the at least part thereof may be electrically connected to the ground plane of the circuit board 340 through a metal part of the flexible printed circuit board 360, at least part of the plate 350, and the second connection member 392. According to an embodiment, the second connection member 392 may include a c-clip, a flexible printed circuit board, or a coaxial cable. According to an embodiment, the second connection member 392 is not limited to the above, and may include various means for ground connection between the antenna 370 and the circuit board 340. The second connection member 392 may be defined and/or referred as to a second conducive member, a second connector, a conductive path, or a second metal member.

According to an embodiment, the antenna 370 may overlapped with the circuit board 340 in a thickness direction (e.g., the Z-axis direction of FIGS. 3A and 3B) of the first housing 301.

According to an embodiment, the first connection member 391 may be overlapped with the antenna 370 and the circuit board 340 in the thickness direction. For example, the first connection member 391 may be disposed between the antenna 370 and the circuit board 340.

According to an embodiment, the second connection member 392 may be overlapped with the antenna 370 and the circuit board 340 in the thickness direction. For example, the second connection member 392 may be disposed between the antenna 370 and the circuit board 340.

According to an embodiment, as the antenna 370 and the circuit board 330 are overlapped in the thickness direction, a conductive path for connecting the antenna 370 and the circuit board 340 may be minimized.

According to an embodiment, the antenna 370 may be directly connected to the circuit board 340.

According to an embodiment, the first connection member 391 may be not overlapped with the second connection member in the thickness direction.

According to an embodiment, the electronic device 300 may further include a communication module 345 (e.g., the communication module 190 of FIG. 1) or a tuning component 346.

According to an embodiment, the circuit board 340 may include a first surface 341 and a second surface 342 facing an opposite direction to the first surface 341. The first connection member 391 and the second connection member 392 may be mounted on the first surface 341 of the circuit board 340. The tuning component 346 may be mounted on the first surface 341 of the circuit board 340. The communication module 345 may be mounted on the second surface 342 of the circuit board 340.

According to an embodiment, the communication module 345 may be configured to transmit and/or receive signals with an external electronic device through the antenna 370.

According to an embodiment, the communication module 345 may be electrically connected to the antenna 370 using the circuit board 340 and the first connection member 345.

According to an embodiment, the communication module 345 may be overlapped with the first connection member 391 based on the thickness direction of the first housing 301 (e.g., the Z-axis direction of FIGS. 3A and 3B). For example, the communication module 345 may be mounted on the second surface 342 of the circuit board 340 and may be positioned correspondingly to the first connection member 391. Also, the communication module 345 may be electrically connected to the first connection member 391 by using a conductive via of the circuit board 340. By minimizing a conductive connection path between the communication module 345 and the first connection member 391, a loss of signals transmitted between the communication module 345 and the antenna 370 may be reduced or minimized. In addition, a heat accumulated in the communication module 345 may be dissipated through the first connection member 391 and the antenna 370.

According to an embodiment, the electronic device 300 may further include an tuning component 346 to prevent (or limit) the degradation of the performance of the antenna 370 when the user's body and the antenna 370 are placed close to each other by use of the plurality of keyboard key caps 330.

According to an embodiment, the tuning component 346 may be mounted on the second surface 342 of the circuit board 340 and may be disposed adjacent to the first connection member 391. The tuning component 346 may include an antenna tuner or an impedance matching circuit. The tuning component 346 may maximize the radiation efficiency of the antenna 370 in free space by matching the impedance or tuning resonant frequency. The tuning component 346 may include at least one low-pass filter and/or a band stop filter, and the low-pass filter may include at least one capacitor. The tuning component 346 may further include an X-ground switch or an X-ground IC.

Figure 4:
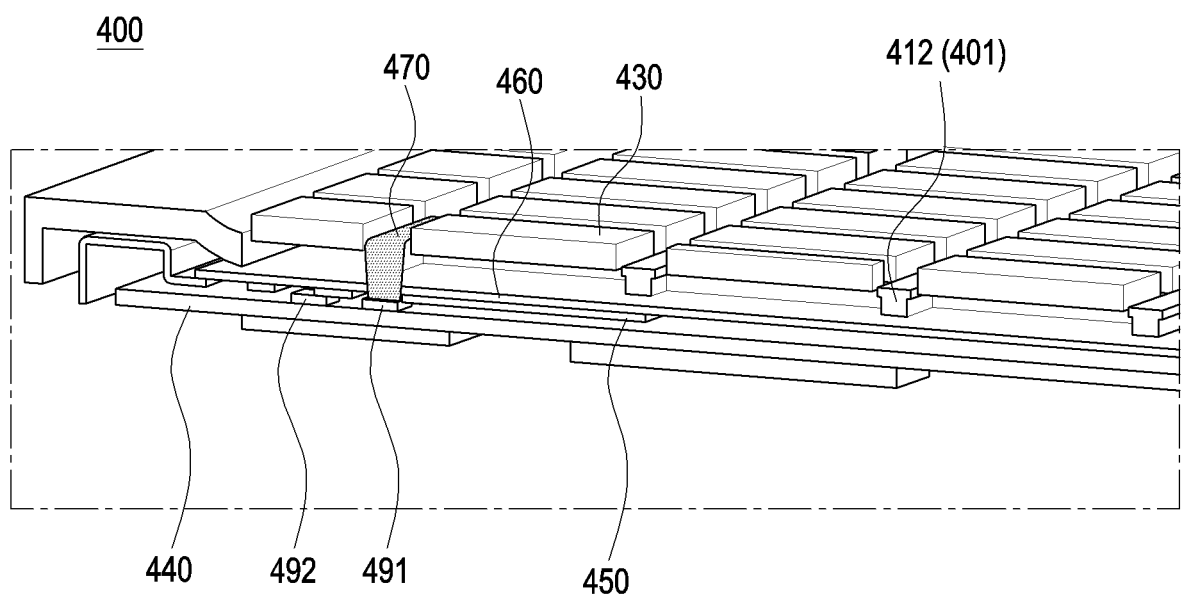
FIG. 4 is a sectional perspective view illustrating an electronic device according to an embodiment of the disclosure.

FIG. 4 is a sectional perspective view illustrating an electronic device according to an embodiment of the disclosure.

Referring to FIG. 4, an electronic device 400 (e.g., the electronic device 101 of FIG. 1, the electronic device 200 of FIG. 2, or the electronic device 300 of FIGS. 3A and 3B) may include a first housing 401, a cover member 412, a plurality of keyboard key caps 430, a circuit board 440, a plate 450, a flexible printed circuit board 460, an antenna 470, and at least one connection member 491 and 492.

The configuration of the electronic device 400 of FIG. 4 may be partially or wholly identical to that of the electronic device 101 of FIG. 1, the electronic device 200 of FIG. 2, or the electronic device 300 of FIGS. 3A and 3B. The configurations of the first housing 401, the cover member 412, the plurality of keyboard key caps 430, the circuit board 440, the plate 450, the antenna 470, and the at least one connection member 491 and 492 of FIG. 4 may be partially or wholly identical to those of the first housing 301, the cover member 312, the plurality of keyboard key caps 330, the circuit board 340, the plate 350, the antenna 370, and the at least one connection member 391 and 392 of FIGS. 3A and 3B. The embodiment of FIG. 4 may be combined with the embodiments of FIGS. 1 to 3B or the embodiment of FIGS. 5 to 13.

According to an embodiment, the first housing 401 (e.g., the cover member 412) may include a plurality of openings (e.g., the openings 314 of FIGS. 3A to 3B) formed in at least part thereof, and the plurality of keyboard key caps 430 may be disposed in the openings of the first housing 401, respectively.

Figure 3B:
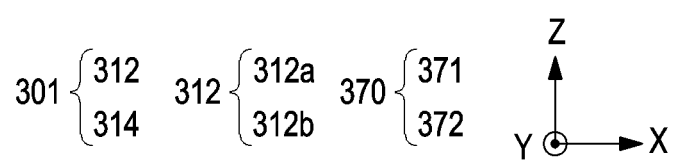

According to an embodiment, at least part of the antenna 470 may be electrically connected to the circuit board 440 using a first connection member 491 (e.g., the first connection member 391 of FIG. 3). Part of the antenna 470 other than the at least part thereof may be electrically connected to a ground plane of the circuit board 440 using a second connection member 492 (e.g., the second connection member 492 of FIG. 3).

According to an embodiment, the circuit board 440 may be connected to the antenna 470 using the first connection member 491, for antenna signal feeding, and a ground plane of the circuit board 440 may be connected to the antenna 470 through the second connection member 492 (e.g., the second connection member 492, at least part of the plate 450, and at least part of the flexible printed circuit board 460), for grounding.

According to an embodiment at least part of the antenna 470 may be disposed between some of the plurality of keyboard key caps 430. According to an embodiment, the antenna 470 may be spaced apart from the cover member 412 so as not to be electrically connected to the cover member 412.

Figure 5:
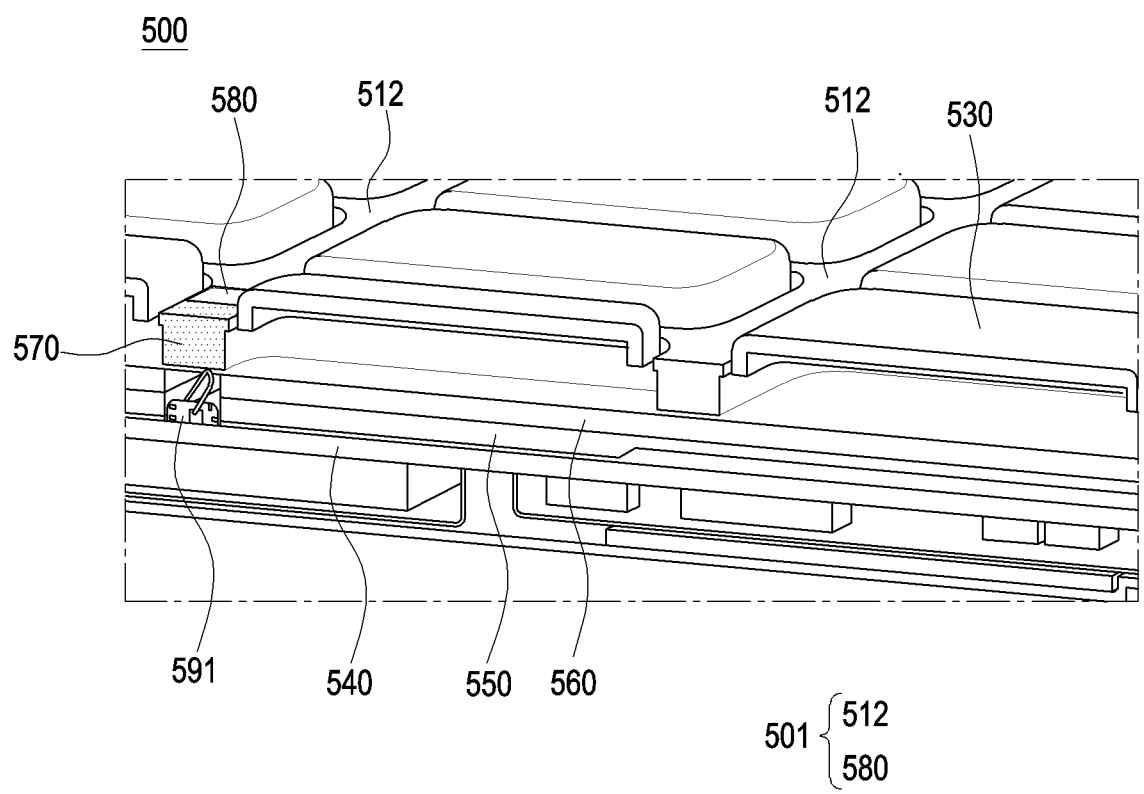
FIG. 5 is a sectional perspective view illustrating an electronic device according to an embodiment of the disclosure.

FIG. 5 is a sectional perspective view illustrating an electronic device according to an embodiment of the disclosure.

Referring to FIG. 5, an electronic device 500 (e.g., the electronic device 101 of FIG. 1, the electronic device 200 of FIG. 2, the electronic device 300 of FIGS. 3A to 3B, or the electronic device 400 of FIG. 4) may include a first housing 501, a cover member 512, a plurality of keyboard key caps 530, a circuit board 540, a plate 550, a flexible printed circuit board 560, an antenna 570, and a first connection member 591.

The configuration of the electronic device 500 of FIG. 5 may be partially or wholly identical to that of the electronic device 101 of FIG. 1, the electronic device 200 of FIG. 2, the electronic device 300 of FIGS. 3A to 3B, or the electronic device 400 of FIG. 4. The configurations of the first housing 501, the cover member 512, the plurality of keyboard key caps 530, the circuit board 540, the plate 550, the antenna 570, and the first connection member 591 of FIG. 5 may be partially or wholly identical to those of the first housings 301 and 401, the cover member 312 and 412, the plurality of keyboard key caps 330 and 430, the circuit boards 340 and 440, the plates 350 and 450, the antennas 370 and 470, and the first connection members 391 and 491 of FIGS. 3A to 4. The embodiment of FIG. 5 may be combined with the embodiments of FIGS. 1 to 4 or the embodiments of FIGS. 6A to 13.

According to an embodiment, the electronic device 500 may further include a non-conductive portion 580. For example, the first housing 501 may include a cover member 512, a plurality of openings (e.g., the plurality of openings 314 of FIGS. 3A to 3B) or a non-conductive portion 580.

According to an embodiment, the non-conductive portion 580 may form at least part of the first housing 501. The non-conductive portion 580 may be defined and/or interpreted as a part of the first housing 501. For example, the first housing 501 may include the cover member 512 forming a body of the first housing 512 and the non-conductive portion 580 formed of a non-metal material disposed in at least a part of the metal portion. The non-conductive portion 580 may be formed through injection molding in the cover member 512. The non-conductive portion 580 may be manufactured in a separate member of the cover member 512 and may be assembled in the cover member 512.

According to an embodiment, the cover member 512 may be defined and/or referred to as a conductive portion, a conductive area, a metal portion, or a metal area of the first housing 501. The non-conductive portion 580 may be defined and/or referred to as a non-conductive portion, a non-conductive area, a non-metal portion, a non-metal area, or a segmenter of the first housing 501.

According to an embodiment, the non-conductive portion 580 may be formed of a non-metal material. According to an embodiment, the non-conductive portion 580 may include a plastic, a resin, or a metal oxide. The metal oxide may include a magnesium oxide or an aluminum oxide. The non-conductive portion 580 may be disposed between the cover member 512 and the antenna 570 and may be configured to electrically separate the cover member 512 and the antenna 570. The non-conductive portion 580 may be disposed between at least part of the cover member 512 and the antenna 570. According to an embodiment, the antenna 570 may be connected to the non-conductive portion 580. According to an embodiment, the antenna 570 may not be connected to the cover member 512.

According to an embodiment, at least part of the antenna 570 may be exposed to the outside of the electronic device 500 and used as a radiation conductor for antenna signal radiation. According to an embodiment, at least part of the antenna 570 may be electrically connected to the circuit board 540 using the first connection member 591.

According to an embodiment, the antenna 570 may be configured to be electromagnetically coupled to the cover member 512 made of a conductive material or a metal material, and the radiation efficiency of a signal radiated from the antenna 570 may be improved.

Figure 6A:
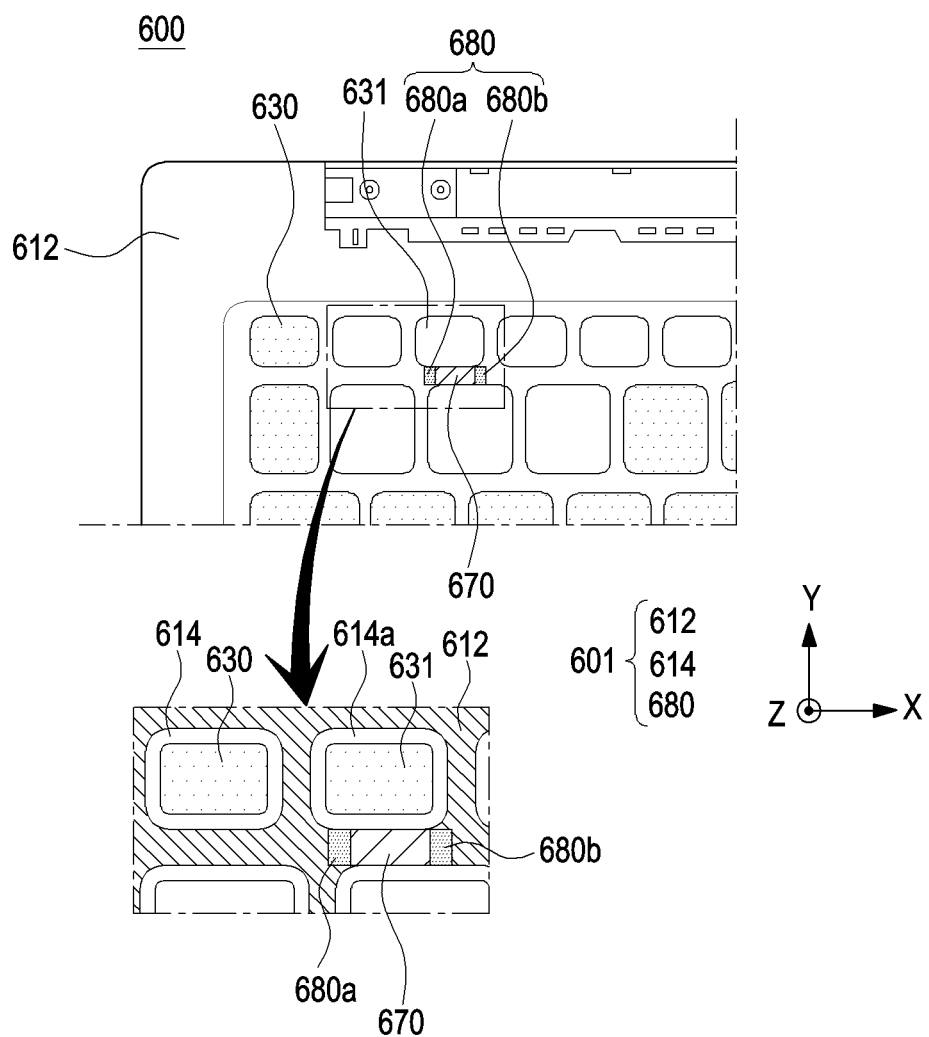
FIG. 6A is a front view illustrating an antenna in an electronic device according to an embodiment of the disclosure.

FIG. 6A is a front view illustrating an antenna in an electronic device according to an embodiment of the disclosure.

Figure 6B:
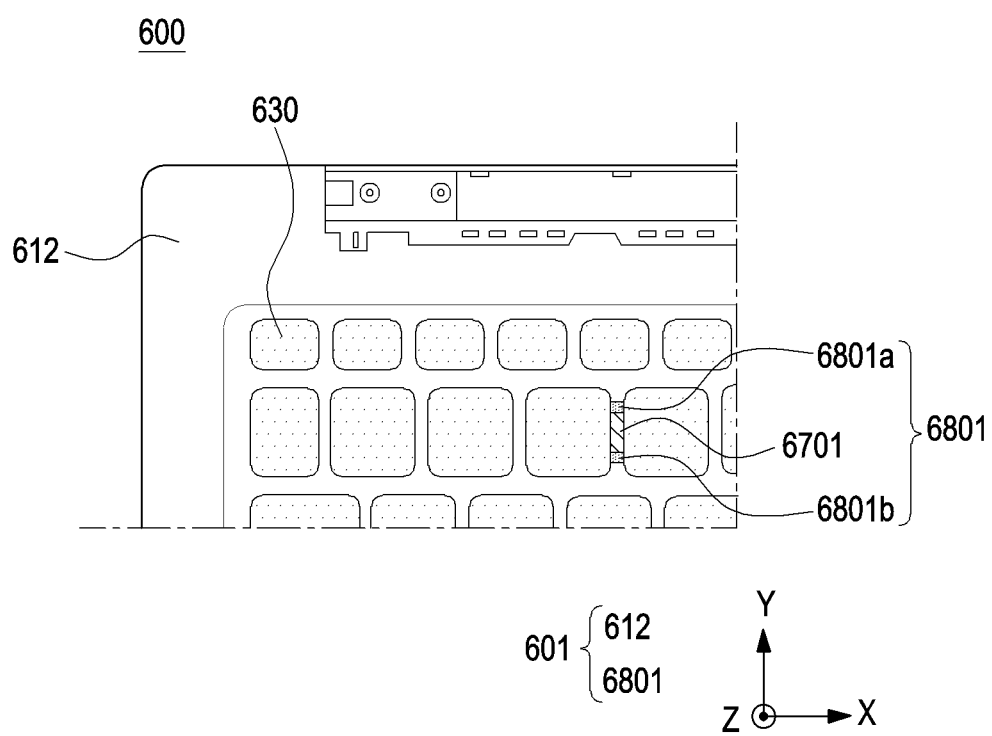
FIG. 6B is a front view illustrating an antenna in an electronic device according to an embodiment of the disclosure.

FIG. 6B is a front view illustrating an antenna in an electronic device according to an embodiment of the disclosure.

Figure 6C:
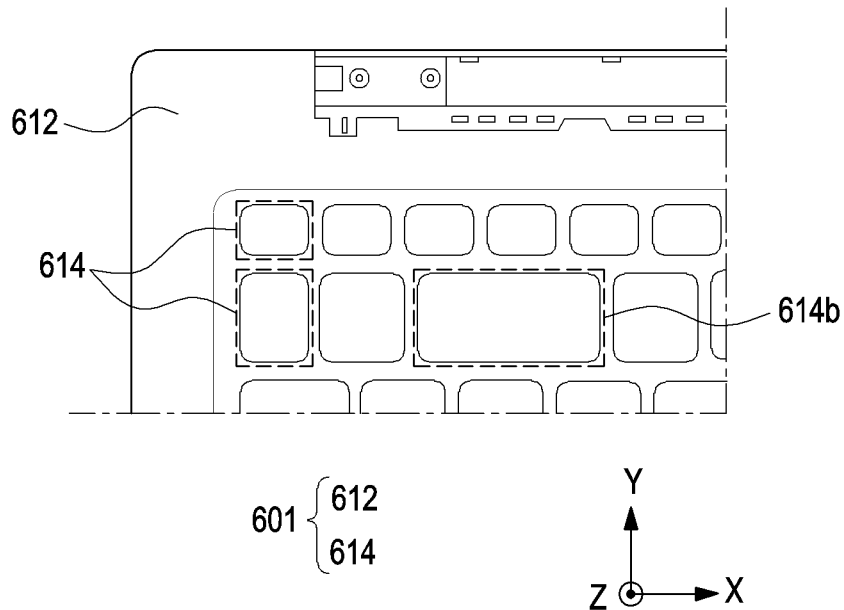
FIG. 6C is a front view illustrating an antenna in an electronic device according to an embodiment of the disclosure.

FIG. 6C is a front view illustrating an antenna in an electronic device according to an embodiment of the disclosure.

Figure 6D:
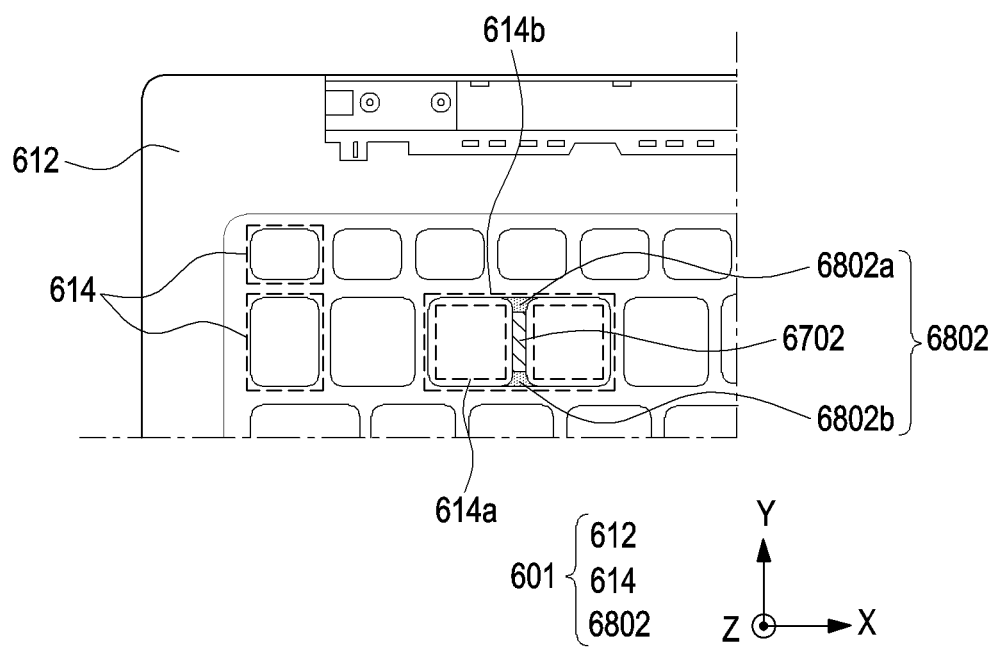
FIG. 6D is a front view illustrating an antenna in an electronic device according to an embodiment of the disclosure.

FIG. 6D is a front view illustrating an antenna in an electronic device according to an embodiment of the disclosure.

The embodiments of FIGS. 6A to 6D may be combined with the embodiments of FIGS. 1 to 5 or the embodiments of FIGS. 7 to 13.

Referring to FIGS. 6A to 6D, an electronic device 600 (e.g., the electronic device 101 of FIG. 1, the electronic device 200 of FIG. 2, the electronic device 300 of FIGS. 3A to 3B, the electronic device 400 of FIG. 4, or the electronic device 500 of FIG. 5) may include a first housing 601, a cover member 612, a plurality of openings 614, a plurality of keyboard key caps 630, an antenna 670, 6701, and 6702, and a non-conductive portion 680, 6801, and 6802.

The configuration of the electronic device 600 of FIGS. 6A to 6D may be partially or wholly identical to that of the electronic device 101 of FIG. 1, the electronic device 200 of FIG. 2, the electronic device 300 of FIGS. 3A to 3B, the electronic device 400 of FIG. 4, or the electronic device 400 of FIG. 5. The configurations of the first housing 601, the cover member 612, the plurality openings 614, the plurality of keyboard key caps 630, and the antenna 670 of FIGS. 6A to 6D may be partially or wholly identical to those of the first housing 212, 301, 401, and 501, the cover member 312, 412, and 512, the plurality of openings 314, the plurality of keyboard key caps 230, 330, 430, and 530, and the antennas 270, 370, 470, and 570 of FIGS. 2 to 5. The configuration of the non-conductive portion 680, 6801, and 6802 of FIGS. 6A to 6D may be partially or wholly identical to that of the non-conductive portion 580 of FIG. 5.

According to an embodiment, the housing 601 may include a cover member 612, a plurality of openings 614, or a plurality of non-conductive portions 680, 6801, and 6802.

According to an embodiment, the non-conductive portion 680, 6801, and 6802 may be disposed between some of the plurality of keyboard key caps 630. According to an embodiment, the non-conductive portion 680, 6801, and 6802 may be connected to the first housing 601 (e.g., the cover member 412). According to an embodiment, the plurality of openings 680, 6801, and 6802 may be provided.

According to an embodiment, the antenna 670, 6701, and 6702 may be spaced apart from at least part of the cover member 612. According to an embodiment, at least part of the antenna 670, 6701, and 6702 may be connected to the non-conductive portion 680, 6801, and 6802. According to an embodiment, the antenna 670, 6701, and 6702 may not be directly connected to the cover member 612. According to an embodiment, the antenna 670, 6701, and 6702 may be spaced apart from the cover member 612. For example, the antenna 670, 6701, and 6702 may be separated from the cover member 612 by the non-conductive portion 680, 6801, and 6802.

According to an embodiment, at least part of the antenna 670, 6701, and 6702 may be disposed between some of the plurality of keyboard key caps 630.

Referring to FIG. 6A, the plurality of keyboard key caps 630 may be disposed in the plurality of openings 614 (e.g., the plurality of openings 314 of FIGS. 3A to 3B) formed in the cover member 612. The plurality of openings 614 may be a plurality of holes formed in the cover member 612. The plurality of keyboard key caps 630 may be exposed to the outside through the plurality of openings 614. According to an embodiment, at least one of the plurality of openings 614 (e.g., the opening 614a of FIG. 6A) may be defined by the cover member 612, the plurality of non-conductive portions 680a, and 680b, and the antenna 670. For example, the inner surfaces (or sides) forming at least one of the plurality of openings (614a of FIG. 6A) may be formed by a combination of the cover members (612), the plurality of non-conductive portions 680a, and 680b, and the antenna 670. For example, at least one keyboard key cap 631 may be disposed in the opening 614a at least partially defined by at least a portion of the antenna 670. According to an embodiment, the plurality of keyboard key caps 630 may form a predetermined gap with the cover member 612.

Referring to FIGS. 6A and 6B, the non-conductive portion 680, and 6801 may include a plurality of non-conductive portions 680a, 680b, 6801a, and 6801b. According to an embodiment, the plurality of non-conductive portions 680a, 680b, 6801a, and 6801b may be disposed such that the antenna 670, and 6701 and the cover member 612 are separated from each other without being connected.

According to an embodiment, the antenna 670, and 6701 may be defined and interpreted as, but not limited to, a monopole antenna. According to an embodiment, the antenna 670, and 6701 may be an antenna (e.g., a B48 pattern) supporting long term evolution (LTE) communication in an about 3.5 gigahertz (GHz) frequency band or an antenna (e.g., an n48 pattern) supporting $5^{th}$ generation (5G) communication in an about 3.5 GHz frequency band.

According to an embodiment, the antenna (e.g., the antenna 670 of FIG. 6A) may be disposed adjacent to the keyboard key cap 631 for inputting a function key among the plurality of keyboard key caps 630. For example, the keyboard keycap 631 for inputting the function key may include a keyboard keycap for inputting ESC or a keyboard keycap for inputting F1 to F12. For example, when a user inputs a keyboard, the antenna 670 may be disposed adjacent to the keyboard keycap 631 for inputting a function key that is not frequently used (or rarely used) by the user. Accordingly, the degradation of radiation performance of the antenna 670 caused by the user's hand may be reduced.

According to an embodiment, the electronic device 600 may configure an antenna of a specific frequency band (or a specified frequency band) by adjusting the length or size of an area where the antenna 670, 6701 is exposed between the plurality of non-conductive portions 680a, 680b, 6801a, and 6801b.

Referring to FIG. 6A, the antenna 670 may be extended lengthwise in one direction (e.g., the X-axis direction of FIG. 6A) between two key caps among the plurality of keyboard key caps 630. The plurality of non-conductive portions 680a and 680b may be disposed at both edges of the antenna 670. For example, the antenna 670 may be extended in the width direction (e.g., the X-axis direction of FIG. 6A) of the cover member 612.

Referring to FIG. 6B, the antenna 6701 may be extended lengthwise in one direction (e.g., the Y-axis direction of FIG. 6B) between two key caps among the plurality of keyboard key caps 630. The plurality of non-conductive portions 6801a and 6801b may be disposed at both edges of the antenna 6701. For example, the antenna 6701 may be extended in the longitudinal direction of the cover member 612 (e.g., the Y-axis direction of FIG. 6B).

Referring to FIGS. 6C and 6D, the opening 614a defined by the cover member 612, the antenna 6702, and the non-conductive portion 6802 is described. The cover member 612 may include the plurality of openings 614. The plurality of openings 614 may be spaced apart from each other. One of the plurality of openings 614b may be separated into two openings 614a by the plurality of non-conductive portions 6802 and the antenna 6702. For example, the plurality of non-conductive portions 6802 and the antenna 6702 may be combined with a portion of the cover member 612 defining the opening 614b. Accordingly, the opening 614b may be divided into two openings 614a. Each of the two openings 614a may be defined by the cover member 612 (e.g., a conductive portion), the antenna 6702, and the plurality of non-conductive portions 6802. The plurality of non-conductive portions 6802 may include two non-conductive portions 6802a, and 6802b coupled to both ends of the antenna 6702, respectively. The antenna 6702 may be separated from or spaced apart from the cover member 612 (e.g., a conductive portion) by two non-conductive portions 6802a, and 6802b coupled to both ends of the antenna 6702.

Figure 7:
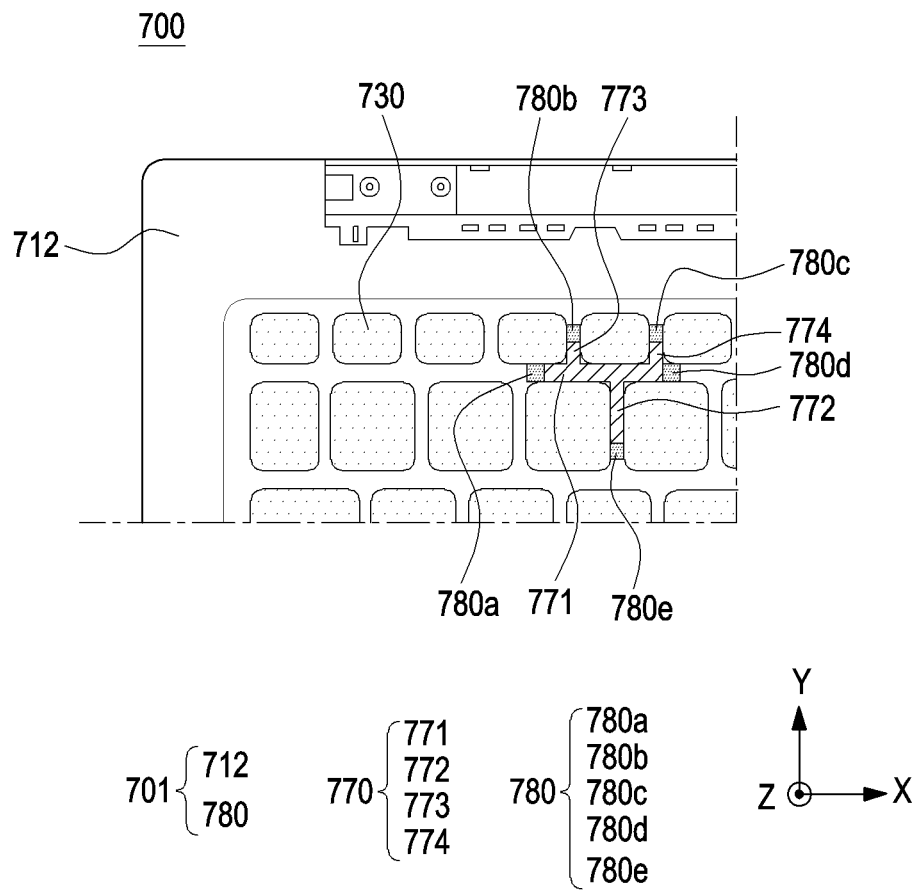
FIG. 7 is a front view illustrating an antenna in an electronic device according to an embodiment of the disclosure.

FIG. 7 is a front view illustrating an antenna in an electronic device according to an embodiment of the disclosure.

Referring to FIG. 7, the configuration of an electronic device 700 may be partially or wholly identical to that of the electronic device 101 of FIG. 1, the electronic device 200 of FIG. 2, the electronic device 300 of FIGS. 3A to 3B, the electronic device 400 of FIG. 4, the electronic device 500 of FIG. 5, or the electronic device 600 of FIGS. 6A to 6D. The configurations of a first housing 701, a cover member 712, a plurality of keyboard key caps 730, and an antenna 770 of FIG. 7 may be partially or wholly identical to those of the first housings 212, 301, 401, 501, and 601, the cover member 312, 412, 512, and 612, the plurality of keyboard key caps 230, 330, 430, 530, and 630, and the antennas 270, 370, 470, 570, 670, 6701, and 6702 of FIGS. 2 to 6D. The configuration of a non-conductive portion 780 of FIG. 7 may be partially or wholly identical to that of the non-conductive portion 580, 680, 6801, and 6802 of FIGS. 5 to 6D. The embodiment of FIG. 7 may be combined with the embodiments of FIGS. 1 to 6D or the embodiments of FIGS. 8 to 13.

Referring to FIG. 7, the electronic device 700 may include a first housing 701, a cover member 712, a plurality of openings (e.g., THE plurality of openings 614 of FIG. 6A), an antenna 770, or a plurality of non-conductive portions 780.

According to an embodiment, the plurality of keyboard key caps 730 may be disposed in the plurality of openings (e.g., the openings 614 of FIGS. 6A to 6D) formed in the cover member 712. The plurality of openings may be defined by the cover member 712. At least one of the plurality openings may be defined by the cover member 712, the antenna 770, and the plurality of non-conductive portions 780.

According to an embodiment, the non-conductive portion 780 may be disposed between some of the plurality of keyboard key caps 730. According to an embodiment, the non-conductive portion 780 may be connected to the first housing 701.

According to an embodiment, the antenna 770 may be spaced apart from at least part of the cover member 712. According to an embodiment, at least part of the antenna 770 may be connected to the non-conductive portion 780. According to an embodiment, the antenna 770 may not be directly connected to the cover member 712. According to an embodiment, the antenna 770 may be spaced apart from the cover member 712.

According to an embodiment, at least part of the antenna 770 may be disposed between some of the plurality of keyboard key caps 730.

According to an embodiment, the non-conductive portion 780 may include a plurality of non-conductive portions 780a, 780b, 780c, 780d, and 780e. According to an embodiment, the plurality of non-conductive portions 780a, 780b, 780c, 780d, and 780e may be disposed such that the antenna 770 and the cover member 712 are separated from each other without being connected.

According to an embodiment, the antenna 770 may include a first part 771 extending in a first direction (e.g., X-axis direction in FIG. 7), and a plurality of second parts 772, 773, and 774 extending from the first part 771 in a second direction (e.g., Y-axis direction in FIG. 7) perpendicular to the first direction. According to an embodiment, the first part 771 of the antenna 770 may be disposed between some keyboard key caps 730 spaced apart from each other in the second direction (e.g., Y-axis direction in FIG. 7) among the plurality of keyboard patterns 730. According to an embodiment, the plurality of second parts 772, 773, and 774 of the antenna 770 may be spaced apart from each other. According to an embodiment, the plurality of second parts 772, 773, and 774 of the antenna 770 may be disposed between some keyboard key caps 730 spaced apart from each other in the first direction (e.g., X-axis direction in FIG. 7) among the plurality of keyboard key caps 730.

According to an embodiment, the antenna 770 may be defined and interpreted as, but not limited to, a planar inverted-F antenna (PIFA) for Bluetooth communication, wireless fidelity (Wi-Fi) communication, or a legacy cellular network (e.g., LTE communication or Sub6 5G communication).

According to an embodiment, the electronic device 700 may configure an antenna of a specific frequency band (or a specified frequency band) by adjusting the length or size of an area where the antenna 770 is exposed between the plurality of non-conductive portions 780a to 780e.

Figure 8:
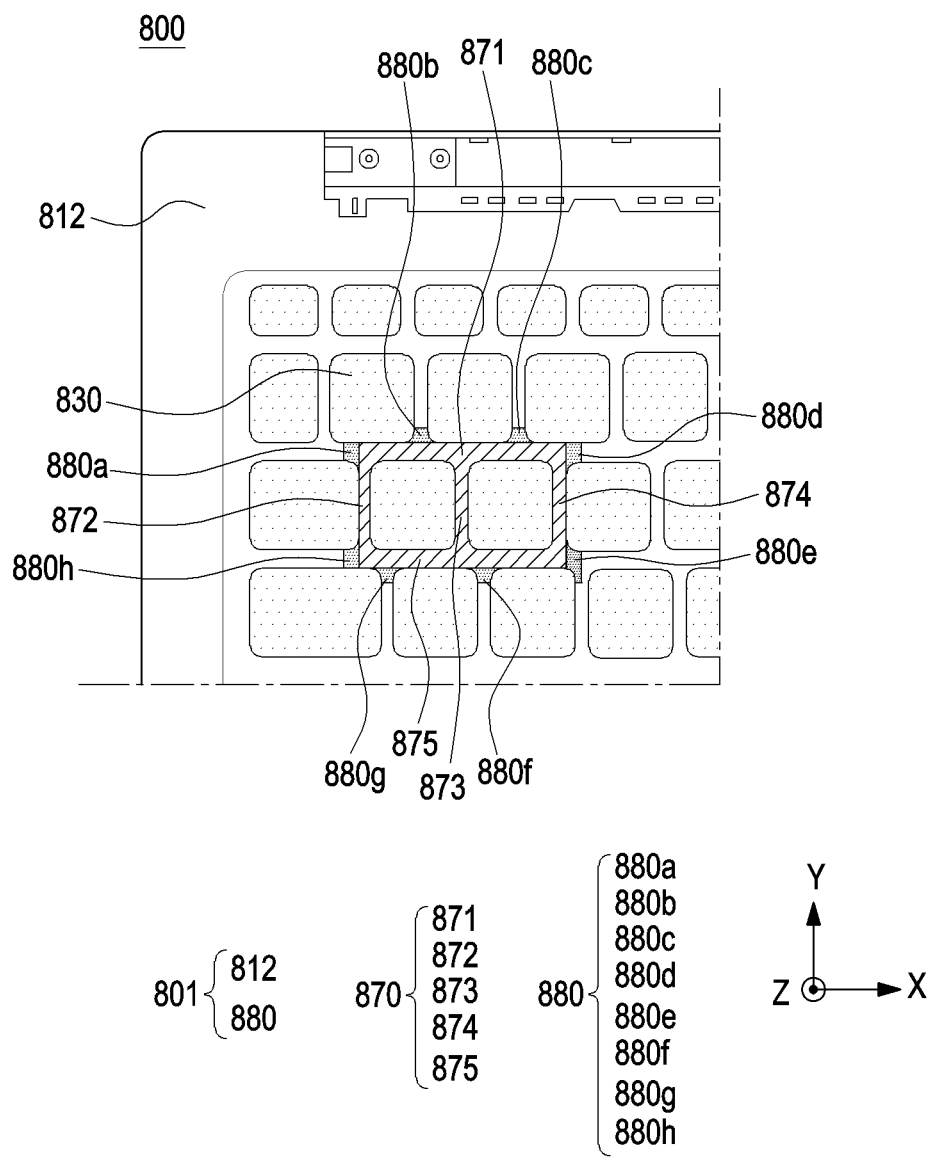
FIG. 8 is a front view illustrating an antenna in an electronic device according to an embodiment of the disclosure.

FIG. 8 is a front view illustrating an antenna in an electronic device according to an embodiment of the disclosure.

Referring to FIG. 8, the configuration of an electronic device 800 may be partially or wholly identical to that of the electronic device 101 of FIG. 1, the electronic device 200 of FIG. 2, the electronic device 300 of FIGS. 3A to 3B, the electronic device 400 of FIG. 4, the electronic device 500 of FIG. 5, the electronic device 600 of FIG. 6, or the electronic device 700 of FIG. 7. The configurations of a first housing 801, a cover member 812, a plurality of keyboard key caps 830, and an antenna 870 of FIG. 8 may be partially or wholly identical to those of the first housings 212, 301, 401, 501, 601, and 701, the cover member 312, 412, 512, 612, and 712, the cover member 312, 412, 512, 612, and 712, the plurality of keyboard key caps 230, 330, 430, 530, 630, and 730, and the antennas 270, 370, 470, 570, 670, 770 of FIGS. 2 to 7. The configuration of a non-conductive portion 880 of FIG. 8 may be partially or wholly identical to that of the non-conductive portion 580, 680, and 780 of FIGS. 5 to 7.

The embodiment of FIG. 8 may be combined with the embodiments of FIGS. 1 to 7, or the embodiments of FIGS. 9 to 13.

Referring to FIG. 8, the electronic device 800 may include a first housing 801, a cover member 812, a plurality of openings (e.g., the plurality of openings 614 of FIG. 6A), an antenna 870, or a plurality of non-conductive portions 880.

According to an embodiment, the plurality of keyboard key caps 830 may be disposed in the plurality of openings (e.g., the openings 614 of FIGS. 6A to 6D) formed in the cover member 812. The plurality of openings may be defined by the cover member 812. At least one of the plurality openings may be defined by the cover member 812, the antenna 870, and the plurality of non-conductive portions 880.

According to an embodiment, the non-conductive portion 880 may be disposed between some of the plurality of keyboard key caps 830. According to an embodiment, the non-conductive portion 880 may be connected to the cover member 812.

According to an embodiment, the antenna 870 may be spaced apart from at least part of the cover member 812. According to an embodiment, at least part of the antenna 870 may be connected to the non-conductive portion 880. According to an embodiment, the antenna 870 may not be directly connected to the cover member 812. According to an embodiment, the antenna 870 may be spaced apart from the cover member 812.

According to an embodiment, at least part of the antenna 870 may be disposed between some of the plurality of keyboard key caps 830.

According to an embodiment, the non-conductive portion 880 may include a plurality of non-conductive portions 880a, 880b, 880c, 880d, 880e, 880f, 880g, and 880h. According to an embodiment, the plurality of non-conductive portions 880a, 880b, 880c, 880d, 880e, 880f, 880g, and 880h may be disposed such that the antenna 870 and the cover member 812 are separated from each other without being connected.

According to an embodiment, the antenna 870 may include a first part 871 extending in a first direction (e.g., X-axis direction in FIG. 8), a plurality of second parts 872, 873, and 874 extending from the first part 871 in a second direction (e.g., Y-axis direction in FIG. 8) perpendicular to the first direction, and a third part 875 extending in the first direction (e.g., X-axis direction in FIG. 8) and spaced apart from the first part 871. According to an embodiment, the first part 871 of the antenna 870 may be disposed between some keyboard key caps 830 spaced apart from each other in the second direction (e.g., Y-axis direction in FIG. 8) among the plurality of keyboard key caps 830. According to an embodiment, the plurality of second parts 872, 873, and 874 of the antenna 870 may be spaced apart from each other. According to an embodiment, the plurality of second parts 872, 873, and 874 of the antenna 870 may be disposed between some keyboard key caps 830 spaced apart from each other in the first direction (e.g., X-axis direction in FIG. 8) among the plurality of keyboard key caps 830.

According to an embodiment, the third part 875 of the antenna 870 may be connected to the plurality of second parts 872, 873, and 874. According to an embodiment, the third part 875 of the antenna 870 may be spaced apart from the first part 871 of the antenna 870.

According to an embodiment, the antenna 870 may be disposed to surround at least one keyboard button 830. For example, the antenna 870 may be disposed adjacent to at least two sides of one of the plurality of keyboard key caps 830.

According to an embodiment, the antenna 870 may be defined and interpreted as, but not limited to, a loop antenna for near field communication (NFC).

According to an embodiment, the electronic device 800 may configure an antenna of a specific frequency band (or a specified frequency band) by adjusting the length or size of an area where the antenna 870 is exposed between the plurality of non-conductive portions 880a to 880h.

Figure 9:
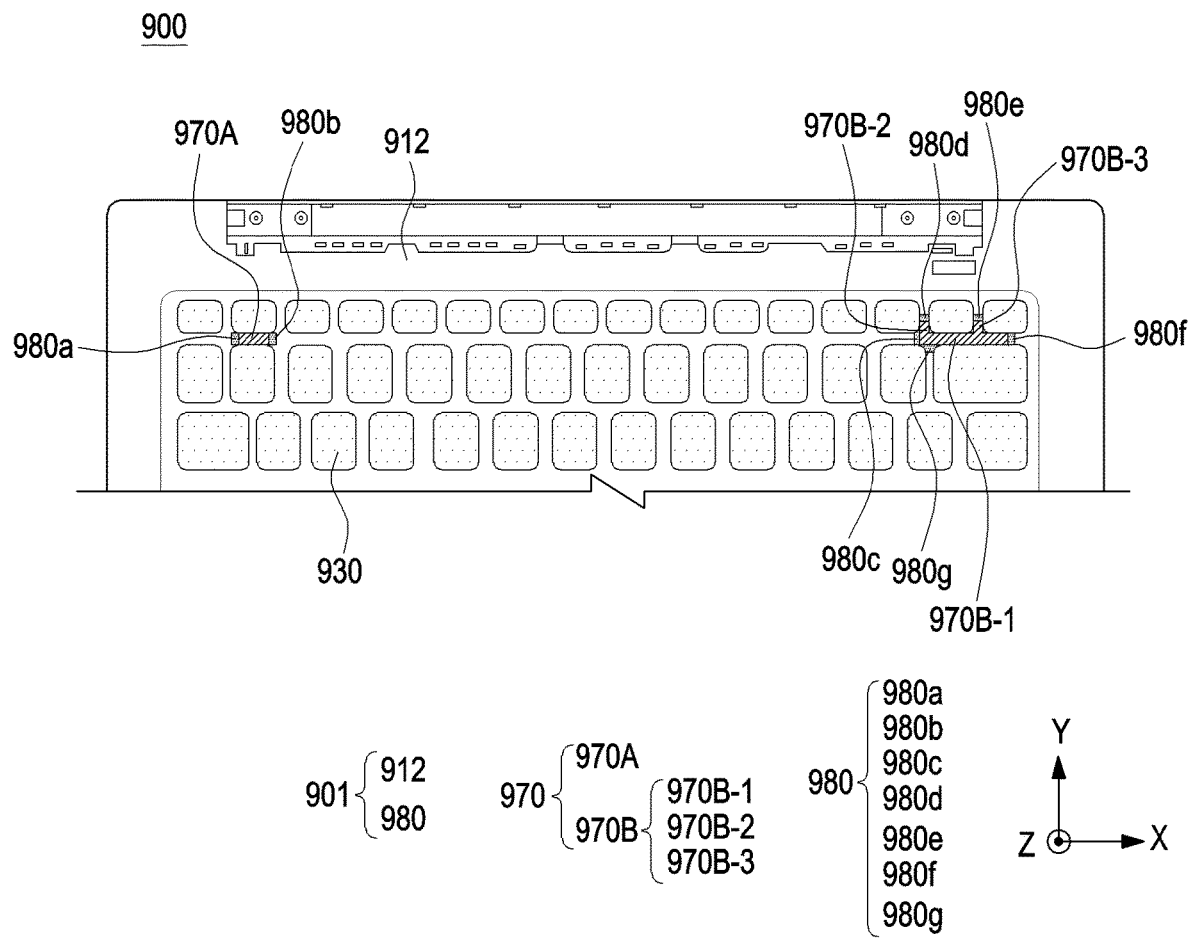
FIG. 9 is a front view illustrating an antenna in an electronic device according to an embodiment of the disclosure.

FIG. 9 is a front view illustrating an antenna in an electronic device according to an embodiment of the disclosure.

Referring to FIG. 9, the configuration of an electronic device 900 may be partially or wholly identical to that of the electronic device 101 of FIG. 1, the electronic device 200 of FIG. 2, the electronic device 300 of FIGS. 3A to 3B, the electronic device 400 of FIG. 4, the electronic device 500 of FIG. 5, the electronic device 600 of FIG. 6, the electronic device 700 of FIG. 7, or the electronic device 800 of FIG. 8. The configurations of a first housing 901, a cover member 912, a plurality of keyboard key caps 930, and an antenna 970 of FIG. 9 may be partially or wholly identical to those of the first housings 212, 301, 401, 501, 601, 701, and 801, the cover member 312, 412, 512, 612, 712, and 812, the plurality of keyboard key caps 230, 330, 430, 530, 630, 730, and 830, and the antennas 270, 370, 470, 570, 670, 770, and 870 of FIGS. 2 to 8. The configuration of a non-conductive portion 980 of FIG. 9 may be partially or wholly identical to that of the non-conductive portion 580, 680, 780, 880 of FIGS. 5 to 8. The embodiment of FIG. 9 may be combined with the embodiments of FIGS. 1 to 8 or the embodiments of FIGS. 10 to 13.

Referring to FIG. 9, the electronic device 900 may include a first housing 901, a cover member 912, a plurality of openings (e.g., the plurality of openings 614 of FIG. 6A), an antenna 970, or a plurality of non-conductive portions 980.

According to an embodiment, the plurality of keyboard key caps 930 may be disposed in the plurality of openings (e.g., the openings 614 of FIGS. 6A to 6D) formed in the cover member 912. The plurality of openings may be defined by the cover member 912. At least one of the plurality openings may be defined by the cover member 912, the antenna 970, and the plurality of non-conductive portions 980.

According to an embodiment, the non-conductive portion 980 may be disposed between some of the plurality of keyboard key caps 930. According to an embodiment, the non-conductive portion 980 may be connected to the cover member 912.

According to an embodiment, the antenna 970 may be spaced apart from at least part of the housing 901. According to an embodiment, at least part of the antenna 970 may be connected to the non-conductive portion 980. According to an embodiment, the antenna 970 may not be directly connected to the cover member 912. According to an embodiment, the antenna 970 may be spaced apart from the cover member 912.

According to an embodiment, at least part of the antenna 970 may be disposed between some of the plurality of keyboard key caps 930.

According to an embodiment, the non-conductive portion 980 may include a plurality of non-conductive portions 980a, 980b, 980c, 980d, 980e, and 980f. According to an embodiment, the plurality of non-conductive portions 980a, 980b, 980c, 980d, 980e, and 980f may be disposed such that the antenna 970 and the cover member 912 are separated from each other without being connected.

According to an embodiment, the antenna 970 may include a first antenna 970A and a second antenna 970B. According to an embodiment, the first antenna 970A and the second antenna 970B may be spaced apart from each other.

According to an embodiment, an one of the first antenna 970A or the second antenna 970B may be disposed adjacent to the keyboard key cap for inputting a function key among the plurality of keyboard key caps 930. For example, the keyboard keycap for inputting the function key may include a keyboard keycap for inputting ESC or a keyboard keycap for inputting F1 to F12. For example, when a user inputs a keyboard, the antenna 970 may be disposed adjacent to the keyboard keycap for inputting a function key that is not frequently used (or rarely used) by the user. Accordingly, the degradation of radiation performance of the antenna 970 caused by the user's hand may be reduced.

According to an embodiment, the first antenna 970A may be disposed between some of the plurality of keyboard key caps 930. According to an embodiment, the first antenna 970A may be electrically connected to a circuit board (e.g., the circuit board 340 of FIGS. 3A to 3B).

According to an embodiment, the first antenna 970A may be connected to some 980a and 980b of the plurality of non-conductive portions 980a, 980b, 980c, 980d, 980e, and 980f. According to an embodiment, the first antenna 970A may not be connected to the first housing 901.

According to an embodiment, the second antenna 970B may include a first part 970B-1 extending in a first direction (e.g., X-axis direction in FIG. 9) and a plurality of second parts 970B-2 and 970B-3 extending from the first part 970B-1 in a second direction (e.g., Y-axis direction in FIG. 9) perpendicular to the first direction. According to an embodiment, the first part 970B-1 of the second antenna 970B may be disposed between some keyboard key caps 930 spaced apart from each other in the second direction (e.g., Y-axis direction in FIG. 9) among the plurality of keyboard key caps 930. According to an embodiment, the plurality of second parts 970B-2 and 970B-3 of the second antenna 970B may be spaced apart from each other. According to an embodiment, the plurality of second parts 970B-2 and 970B-3 of the second antenna 970B may be disposed between some keyboard key caps 930 spaced apart from each other in the first direction (e.g., X-axis direction in FIG. 9) among the plurality of keyboard key caps 930.

According to an embodiment, the electronic device 900 may configure an antenna of a specific frequency band (or a specified frequency band) by adjusting the length or size of an area where the antenna 970 is exposed between the plurality of non-conductive portions 980a to 980f.

Figure 10:
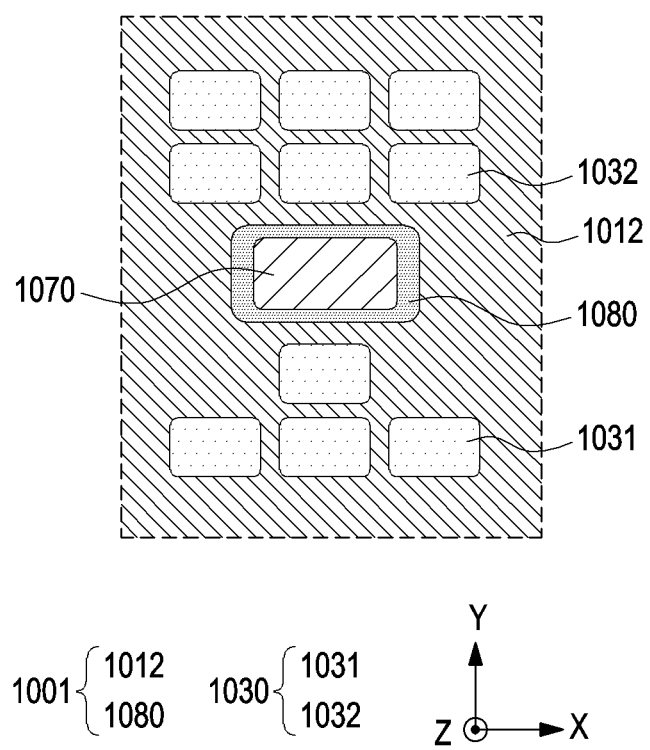
FIG. 10 is a sectional view illustrating an antenna in an electronic device according to an embodiment of the disclosure.

FIG. 10 is a sectional view illustrating an antenna in an electronic device according to an embodiment of the disclosure.

The embodiment of FIG. 10 may be combined with the embodiments of FIGS. 1 to 9, or the embodiments of FIGS. 11A to 13.

Referring to FIG. 10, the electronic device 1000 may include a first housing 1001, a cover member 1012, a plurality of keyboard key caps 1030, an antenna 1070, or a non-conductive portion 1080.

The configuration of the electronic device 1000, the first housing 1001, the cover member 1012, the plurality of keyboard key caps 1030, the antenna 1070 or the non-conductive portion 1080 of FIG. 10 may be partially or wholly identical to those the electronic device 600, 700, 800, and 900, the first housing 601, 701, 801, 801, and 901, the cover member 612, 712, 812, and 912, the plurality of keyboard key caps 630, 730, 830, and 930, the antenna 670, 770, 870, and 970, or the plurality of non-conductive portions 680, 780, 880, and 980 of FIGS. 6A to 9.

According to an embodiment, the plurality of keyboard key caps 1030 may include a plurality of first keyboard key caps 1031 for direction input, or a plurality of second keyboard key caps 1032 for function key input (e.g., insert, home, page up, delete, end, or page down).

According to an embodiment, the plurality of first keyboard key caps 1031 and the plurality of second keyboard key caps 1032 may be spaced apart from each other.

According to an embodiment, the antenna 1070 may be disposed between the plurality of first keyboard key caps 1031 and the plurality of second keyboard key caps 1032.

According to an embodiment, the non-conductive portion 1080 may surround the antenna 1070. For example, the non-conductive portion 1080 may have a loop shape surrounding the antenna 1070. The antenna 1070 may be separated from the cover member 1012 by the non-conductive portion 1080.

Figure 11A:
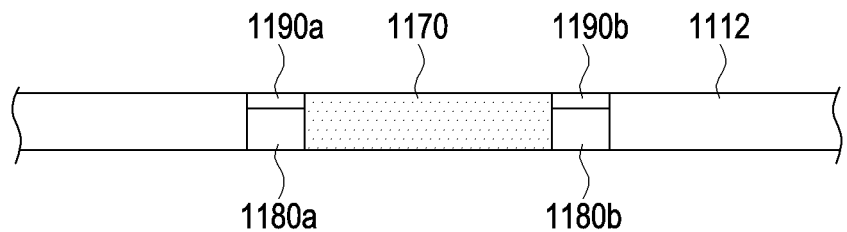
FIG. 11A is a sectional view illustrating an antenna in an electronic device according to an embodiment of the disclosure.

FIG. 11A is a sectional view illustrating an antenna in an electronic device according to an embodiment of the disclosure.

Figure 11B:
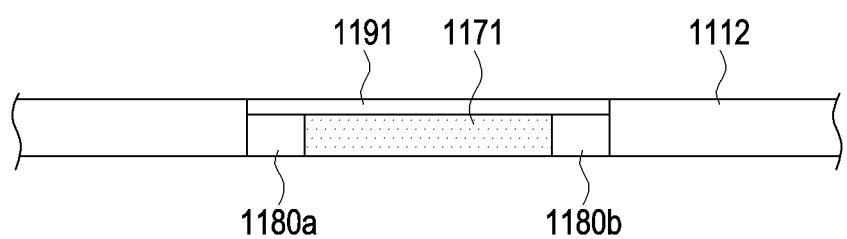
FIG. 11B is a sectional view illustrating an antenna in an electronic device according to an embodiment of the disclosure.

FIG. 11B is a sectional view illustrating an antenna in an electronic device according to an embodiment of the disclosure.

Figure 12:
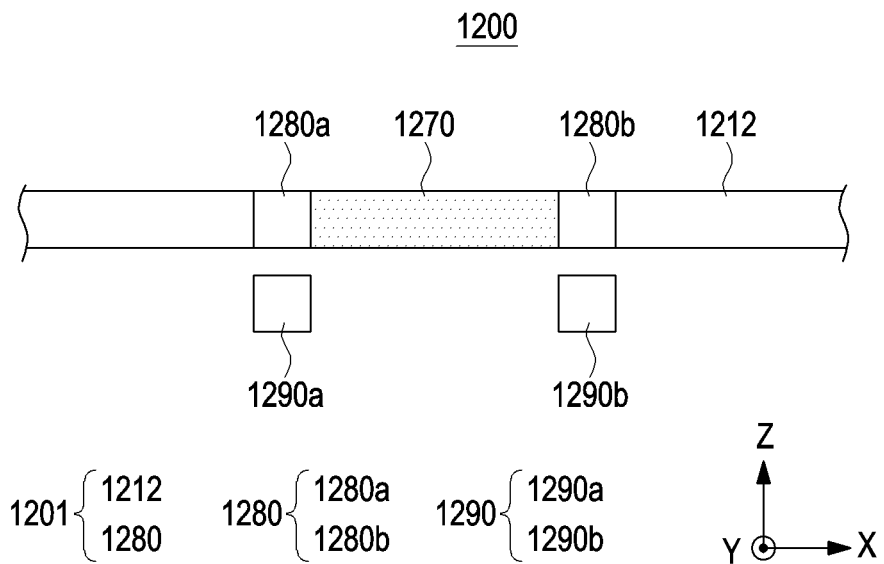
FIG. 12 is a sectional view illustrating an antenna in an electronic device according to an embodiment of the disclosure.
Figure 13:
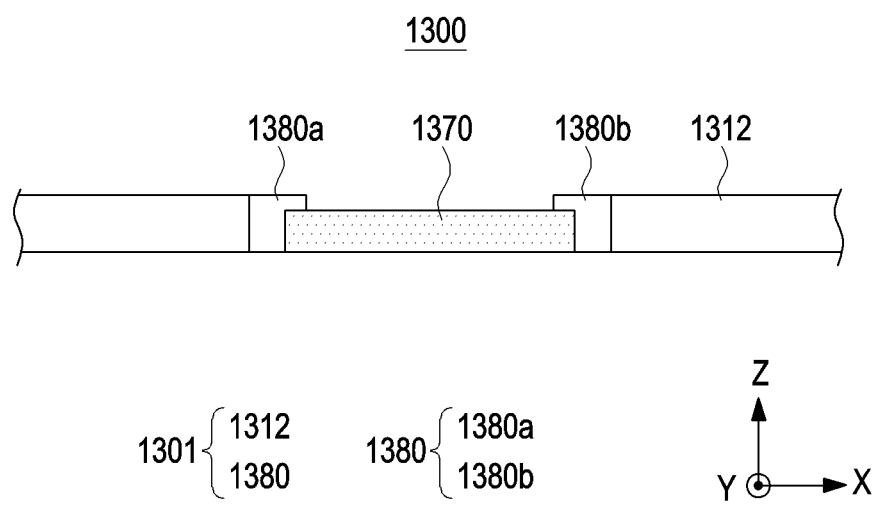
FIG. 13 is a sectional view illustrating an antenna in an electronic device according to an embodiment of the disclosure.

The embodiments of FIGS. 11A to 11B may be combined with the embodiments of FIGS. 1 to 10, or the embodiments of FIGS. 12 to 13.

Referring to FIGS. 11A to 11B, an electronic device 1100 may include a first housing 1101, a cover member 1112, an antenna 1170, and 1171, a plurality of non-conductive portions 1180, or a coat layer 1190, and 1191.

The configuration of the electronic device 1100, the first housing 1101, the cover member 1112, the antenna 1170 or the non-conductive portion 1180 of FIGS. 11A to 11B may be partially or wholly identical to those the electronic device 600, 700, 800, 900, and 1000, the first housing 601, 701, 801, 801, 901, and 1001, the cover member 612, 712, 812, 912, and 1012, the plurality of keyboard key caps 630, 730, 830, 930, and 1030, the antenna 670, 770, 870, 970, and 1070, or the plurality of non-conductive portions 680, 780, 880, 980, and 1080 of FIGS. 6A to 10.

Referring to FIGS. 11A and 11B, both edges of the antenna 1170, and 1171 may be connected to the plurality of non-conductive portions 1180a, and 1180b. The antenna 1170, and 1171 may be separated from the cover member 1112 by the non-conductive portions 1180a, and 1180b.

According to an embodiment, the electronic device 1100 may further include coat layer 1190 and 1191. The coat layer 1190 and 1191 may include a dye having a color or a paint having a color.

Referring to FIG. 11A, the coat layer 1190 may be disposed on upper surfaces of plurality of non-conductive portions 1180a, and 1180b (e.g., a surface facing the Z-axis direction in FIG. 11A). The coat layer 1190 may be provided with a plurality of coat layers 1190a, and 1190b. The colors of the plurality of coat layers 1190a, and 1190b may be substantially the same as the color of the cover member 1112. Accordingly, the cover member 1112 and the non-conductive portions 1180a, and 1180b may not be visually separated from the user.

Referring to FIG. 11B, the coat layer 1191 may be disposed on an upper surface (e.g., a surface facing the Z-axis direction of FIG. 11b) of a plurality of non-conductive parts 1180a and 1180b, and an upper surface of the antenna 1171 (e.g., a surface facing the Z-axis direction of FIG. 11B). The color of the coat layer 1191 may be substantially the same as the color of the cover member 1112. Accordingly, the cover member 1112, the non-conductive portions 1180a and 1180b, and the antenna 1171 may not be visually separated from the user.

FIG. 12 is a sectional view illustrating an antenna in an electronic device according to an embodiment of the disclosure.

The embodiment of FIG. 12 may be combined with the embodiments of FIGS. 1 to 11B, or the embodiment of FIG. 13.

Referring to FIG. 12, an electronic device 1200 may include a first housing 1201, a cover member 1212, an antenna 1270, a plurality of non-conductive portions 1280, or a LED module 1290.

The configuration of the electronic device 1200, the first housing 1201, the cover member 1212, the antenna 1270 or the non-conductive portion 1280 of FIG. 12 may be partially or wholly identical to those the electronic device 600, 700, 800, 900 1000, and 1100, the first housing 601, 701, 801, 801, 901, 1001, and 1101, the cover member 612, 712, 812, 912, 1012, and 1112, the plurality of keyboard key caps 630, 730, 830, 930, 1030, and 1130, the antenna 670, 770, 870, 970, 1070, and 1170, or the plurality of non-conductive portions 680, 780, 880, 980, 1080, and 1180 of FIGS. 6A to 11.

Referring to FIG. 12, both edges of the antenna 1270 may be connected to the plurality of non-conductive portions 1280a, and 1280b. The antenna 1270 may be separated from the cover member 1112 by the non-conductive portions 1280a, and 1280b.

According to an embodiment, the electronic device 1200 may further include a light emitting diode (LED) module 1290. The LED module 1290 may be mounted on a circuit board (e.g., the circuit board 330 of FIGS. 3A to 3B). The LED module 1290 may be provided with a plurality of LED modules 1290a and 1290b.

According to an embodiment, the plurality of non-conductive portions 1280a and 1280b may be formed of a transparent material. For example, the plurality of non-conductive portions 1280a, and 1280b may include a transparent resin (e.g., epoxy resin) or glass.

According to an embodiment, the plurality of LED modules 1290a, and 1290b may be located corresponding to the plurality of non-conductive portions 1280a, and 1280b. The processor (e.g., the processor 120 of FIG. 1) may be set to control the plurality of LED modules 1290a, and 1290b. For example, a light output from the plurality of LED modules 1290a, and 1290b may be provided to the outside of the electronic device 1200 through the plurality of non-conductive portions 1280a, and 1280b.

According to an embodiment, the processor (e.g., processor 120 of FIG. 1) may be set to output light of a predetermined color through the plurality of LED modules 1290a, and 1290b when charging the battery of the electronic device 1200 (e.g., battery 189 of FIG. 1) or when the electronic device 1200 is turned on or off.

According to an embodiment, the upper surface of the cover member 1212 (e.g., the upper surface in the Z-axis direction of FIG. 12), the upper surfaces of plurality of non-conductive portions 1280 (e.g., the upper surface in the Z-axis direction of FIG. 12), and the upper surface of the antenna 1270 (e.g., the upper surface in the Z-axis direction of FIG. 12) may form a substantially a flat surface.

FIG. 13 is a sectional view illustrating an antenna in an electronic device according to an embodiment of the disclosure.

The embodiment of FIG. 13 may be combined with the embodiments of FIGS. 1 to 12.

Referring to FIG. 13, an electronic device 1300 may include a first housing 1301, a cover member 1312, an antenna 1370, or a plurality of non-conductive portions 1280.

The configuration of the electronic device 1300, the first housing 1301, the cover member 1312, the antenna 1370 or the non-conductive portion 1380 of FIG. 13 may be partially or wholly identical to those the electronic device 600, 700, 800, 900 1000, 1100, and 1200 the first housing 601, 701, 801, 801, 901, 1001, 1101, and 1201, the cover member 612, 712, 812, 912, 1012, 1112, and 1212, the plurality of keyboard key caps 630, 730, 830, 930, 1030, 1130, and 1230, the antenna 670, 770, 870, 970, 1070, 1170, and 1270, or the plurality of non-conductive portions 680, 780, 880, 980, 1080, 1180, and 1280 of FIGS. 6A to 12.

Referring to FIG. 13, both edges of the antenna 1370 may be connected to the plurality of non-conductive portions 1380a, and 1380b. The antenna 1370 may be separated from the cover member 1312 by the non-conductive portions 1380a, and 1380b.

According to an embodiment, each of the plurality of non-conductive portions 1380a and 1380b may cover an upper portion of both edges of the antenna 1370. For example, the plurality of non-conductive portions 1380a and 1380b may be configured to cover at least a portion of the upper surface of the antenna 1370.

According to an embodiment, the plurality of non-conductive portions 1380a and 1380b may be configured to limit separation of the antenna 1370. For example, when an external impact is applied to the electronic device 1300, the antenna 1370 may be limited from being separated upward by the plurality of non-conductive parts 1380a and 1380b.

Referring to FIGS. 3A to 13, the cover member 312, 412, 512, 612, 712, 812, 912, 1012, 1112, 1212, and 1312 may be defined and/or referred to as the conductive portion.

An electronic device (e.g., a notebook electronic device) having a communication function, such as a portable terminal becomes smaller and more lightweight to maximize user portability and convenience, and has integrated components arranged in an increasingly smaller space, for high performance.

According to an embodiment of the disclosure, an antenna structure with an antenna disposed between a plurality of keyboard key caps, and an electronic device including the same may be provided.

However, the problems to be solved in the disclosure are not limited to the above-mentioned one, and may be extended in various manners without departing from the spirit and scope of the disclosure.

An electronic device according to an embodiment of the disclosure may secure a space for mounting components therein in an inner space of a housing because at least part of an antenna is exposed to the outside of the housing.

An electronic device according to an embodiment of the disclosure may configure an antenna of a specific frequency band (or a specified frequency band) by adjusting the length of an exposed area of an antenna between a plurality of non-conductive portions.

The effects achievable in the disclosure are not limited to what has been described above, and those skilled in the art will clearly understand other unmentioned effects from the following description.

According to an embodiment of the disclosure, an electronic device 101 may comprise: a housing 301, and 601 including a conductive portion 312, and 612, a plurality of non-conductive portions 680, and a plurality of openings 314, and 614, a plurality of keyboard key caps 330, and 630 exposed through the plurality of openings of the housing, an antenna 370, and 670, and a circuit board 340 disposed inside the housing and electrically connected to the antenna. At least one of the plurality of openings may be defined by the conductive portion, the plurality of the non-conductive portions, and the antenna.

According to an embodiment, the antenna 670 may be extended lengthwise in one direction between two key caps of the plurality of keyboard key caps, and two non-conductive portions 680*a*, and 680*b* of the plurality of non-conductive portions may be disposed at both edges of the antenna.

According to an embodiment, the antenna 770 may include: a first part 771 extending in a first direction with respect to two key caps of the plurality of keyboard key caps and a second part 772, 773, and 774 extending in a second direction perpendicular to the first direction.

According to an embodiment, the antenna 870 may be disposed adjacent to at least two sides of one of the plurality of keyboard key caps.

According to an embodiment, the antenna may include: a first antenna 970A; and a second antenna 970B spaced apart from the first antenna.

According to an embodiment, at least one of the first antenna or the second antenna may be disposed adjacent to a keyboard key cap for a function key input among the plurality of the keyboard key caps.

According to an embodiment, the first antenna 970A may be extended in a first direction, and the second antenna 970B may include: a first part 970B-1 extending in the first direction and a second part 970B-2, and 970B-3 extending from the first part in a second direction perpendicular to the first direction.

According to an embodiment, a plurality of second parts may be provided, and the plurality of second parts may be spaced apart each other.

According to an embodiment, the electronic device may further comprise: a first connection member 391 may be configured to electrically connect at least part of the antenna to the circuit board to transmit an antenna signal and a second connection member 392 may be configured to electrically connect a ground of the circuit board to other part of the antenna.

According to an embodiment, the electronic device may further comprise: a communication module 345 may be disposed in the circuit board.

According to an embodiment, the first connection member may be mounted on a first surface 341 of the circuit board, and the communication module may be mounted on a second surface 342 of the circuit board facing in a direction opposite to the first surface of the circuit board and located corresponding to the first connection member.

According to an embodiment, the electronic device may further comprise: a flexible printed circuit board 360 may be configured to provide an electrical signal for a user input received from the plurality of keyboard key caps to the circuit board and a plate 350 may be disposed to support the flexible printed circuit board.

According to an embodiment, the antenna may be electrically connected to the first connection member through a hole formed in the flexible printed circuit board and a hole formed in the plate.

According to an embodiment, the second connection member may be configured to contact at least part of the plate and may be electrically connected to the antenna through the plate and at least part of the flexible printed circuit board electrically connected to the plate.

According to an embodiment, the electronic device may further comprise: a coat layer 1190 may be disposed on an outside surface of the plurality of non-conductive portions and has substantially the same color as the color of the conductive portion.

According to an embodiment of the disclosure, an electronic device 101 may comprise: a first housing 212, 301, and 601 including a conductive portion 312, and 612, at least one non-conductive portion 680 disposed in the conductive portion, and a plurality of openings 314, and 614, a second housing 214 rotatably connected to the first housing, a plurality of keyboard key caps 230, 330, and 630 exposed through the plurality of openings of the first housing, an antenna 270, 370, and 670 disposed in the first housing, a display 220 disposed on the second housing and a circuit board 340 disposed inside the first housing and electrically connected to the antenna. The antenna may be separated from the conductive portion by the at least one non-conductive portion.

According to an embodiment, the antenna may be overlapped with the circuit board in a thickness direction of the first housing.

According to an embodiment, the conductive portion, the at least one non-conductive portion and the antenna may be configured to form a substantially flat surface.

According to an embodiment, the at least one non-conductive portion 1080 may have a loop shape surrounding the antenna.

According to an embodiment, the electronic device may further comprise: a tuning component may be mounted on the circuit board and may be configured to tune the radiation of an antenna signal through the antenna.

According to an embodiment of the disclosure, an electronic device (e.g., the electronic device 101 of FIG. 1, the electronic device 200 of FIG. 2, the electronic device 300 of FIG. 3, the electronic device 400 of FIG. 4, the electronic device 500 of FIG. 5, the electronic device 600 of FIG. 6, the electronic device 700 of FIG. 7, the electronic device 800 of FIG. 8, or the electronic device 900 of FIG. 9) may include a housing (e.g., the housing 212 of FIG. 2, the housing 301 of FIG. 3, the housing 401 of FIG. 4, the housing 501 of FIG. 5, the housing 601 of FIG. 6, the housing 701 of FIG. 7, the housing 801 of FIG. 8, or the housing 901 of FIG. 9), a plurality of keyboard key caps (e.g., the plurality of keyboard key caps 230 of FIG. 2, the plurality of keyboard key caps 230 of FIG. 2, the plurality of keyboard key caps 230 of FIG. 2, the plurality of keyboard key caps 230 of FIG. 2, the plurality of keyboard key caps 330 of FIG. 3, the plurality of keyboard key caps 430 of FIG. 4, the plurality of keyboard key caps 530 of FIG. 5, the plurality of keyboard key caps 630 of FIG. 6, the plurality of keyboard key caps 730 of FIG. 7, the plurality of keyboard key caps 830 of FIG. 8, or the plurality of keyboard key caps 930 of FIG. 9), a circuit board (e.g., the circuit board 340 of FIG. 3, the circuit board 440 of FIG. 4, or the circuit board 540 of FIG. 5), a non-conductive portion (e.g., the non-conductive portion 580 of FIG. 5, the non-conductive portion 680 of FIG. 6, the non-conductive portion 780 of FIG. 7, the non-conductive portion 880 of FIG. 8, or the non-conductive portion 980 of FIG. 9), and an antenna (e.g., the antenna 270 of FIG. 2, the antenna 370 of FIG. 3, the antenna 470 of FIG. 4, the antenna 570 of FIG. 5, the antenna 670 of FIG. 6, the antenna 770 of FIG. 7, the antenna 870 of FIG. 8, or the antenna 970 of FIG. 9). The housing may be formed of a metal material. The plurality of keyboard button may be disposed on at least part of the housing. The circuit board may be disposed inside the housing. The non-conductive portion may be disposed between some of the plurality of keyboard key caps. The non-conductive portion may be connected to the housing. The antenna may be electrically connected to the circuit board. the antenna may be at least partially connected to the non-conductive portion. The antenna may be spaced apart from at least part of the housing.

According to an embodiment, the electronic device may further include a flexible printed circuit board (e.g., the flexible printed circuit board 360 of FIG. 3, the flexible printed circuit board 460 of FIG. 4, or the flexible printed circuit board 560 of FIG. 5), and a plate (e.g., the plate 350 of FIG. 3, the plate 450 of FIG. 4, or the plate 550 of FIG. 5). The flexible printed circuit board may be configured to provide an electrical signal for a user input received from the plurality of keyboard key caps to the circuit board. The plate may be disposed to support the flexible printed circuit board.

According to an embodiment, the electronic device may further include a first connection member (e.g., the first connection member 391 of FIG. 3, the first connection member 491 of FIG. 4, or the first connection member 591 of FIG. 5), and a second connection member (e.g., the second connection member 392 of FIG. 3, the second connection member 492 of FIG. 4, or the second connection member 592 of FIG. 5). The first connection member may be configured to electrically connect at least part of the antenna to the circuit board to transmit an antenna signal. The second connection member may be configured to electrically connect a ground of the circuit board to other part of the antenna.

According to an embodiment, at least part of the second connection member may be configured to contact at least part of the plate. According to an embodiment, at least part of the second connection member may be electrically connected to the antenna through the plate and at least part of the flexible printed circuit board connected to the plate.

According to an embodiment, the antenna may extend in one direction between some of the plurality of keyboard key caps.

According to an embodiment of the disclosure, the antenna may include: a first part (e.g., the first part 771 of FIG. 7, the first part 871 of FIG. 8, or the first part 970B-1 of FIG. 9), and a second part (e.g., the second parts 772, 773, and 774 of FIG. 7, the second parts 872, 873, and 874 of FIG. 8, or the second parts 970B-2 and 970B-3 of FIG. 9). The first part may extend in a first direction. The second part may extend from the first part in a second direction perpendicular to the first direction.

According to an embodiment, at least part of the first part may be disposed between some keyboard key caps spaced apart from each other in the second direction among the plurality of keyboard key caps. According to an embodiment, at least part of the second part may be disposed between some keyboard key caps spaced apart from each other in the first direction among the plurality of keyboard key caps.

According to an embodiment, the antenna (e.g., the antenna 870 of FIG. 8) may be disposed to surround at least one of the plurality of keyboard key caps.

According to an embodiment, the antenna may include: a first part (e.g., the first part 771 of FIG. 7, the first part 871 of FIG. 8, or the first part 970B-1 of FIG. 9), and a plurality of second parts (e.g., the second parts 772, 773, and 774 of FIG. 7, the second parts 872, 873, and 874, or the second parts 970B-2 and 970B-3 of FIG. 9). The first part may extend in a first direction. The plurality of second parts may extend from the first part in a second direction perpendicular to the first direction. The plurality of second parts may be spaced apart from each other.

According to an embodiment, the antenna may further include a third part (e.g., the third part 875 of FIG. 8). The third part may be connected to the plurality of second parts. The third part may be spaced apart from the first part.

According to an embodiment, at least part of the third part may be disposed between some keyboard key caps spaced apart from each other in the second direction among the plurality of keyboard key caps.

According to an embodiment, the antenna (e.g., the antenna 970 of FIG. 9) may include: a first antenna (e.g., the first antenna 970A of FIG. 9), and a second antenna (e.g., the second antenna 970B of FIG. 9). The second antenna may be spaced apart from the first antenna.

According to an embodiment, the first antenna may extend in a first direction. According to an embodiment, the second antenna may include: a first part (e.g., the first part 970B-1 of FIG. 9), and a second part (e.g., the second parts 970B-2 and 970B-3 of FIG. 9). The first part may extend in a first direction. The second part may extend from the first part in a second direction perpendicular to the first direction.

According to an embodiment, a plurality of non-conductive portions may be provided. At least part of the antenna may be disposed between some of the plurality of non-conductive portions.

According to an embodiment, at least part of the antenna may be disposed to be exposed to an outside of the housing.

According to an embodiment of the disclosure, an electronic device (e.g., the electronic device 101 of FIG. 1, the electronic device 200 of FIG. 2, the electronic device 300 of FIG. 3, the electronic device 400 of FIG. 4, the electronic device 500 of FIG. 5, the electronic device 600 of FIG. 6, the electronic device 700 of FIG. 7, the electronic device 800 of FIG. 1, or the electronic device 900 of FIG. 9) may include a first housing (e.g., the first housing 212 of FIG. 2, the first housing 301 of FIG. 3, the first housing 401 of FIG. 4, the first housing 501 of FIG. 5, the first housing 601 of FIG. 6, the first housing 701 of FIG. 7, the first housing 801 of FIG. 8, or the first housing 901 of FIG. 9), a second housing (e.g., the second housing 214), a display (e.g., the display 220 of FIG. 2), a plurality of keyboard key caps (e.g., the plurality of keyboard key caps 230 of FIG. 2, the plurality of keyboard key caps 330 of FIG. 3, the plurality of keyboard key caps 430 of FIG. 4, the plurality of keyboard key caps 530 of FIG. 5, the plurality of keyboard key caps 630 of FIG. 6, the plurality of keyboard key caps 730 of FIG. 7, the plurality of keyboard key caps 830 of FIG. 8, or the plurality of keyboard key caps 930 of FIG. 9), a circuit board (e.g., the circuit board 340 of FIG. 3, the circuit board 440 of FIG. 4, or the circuit board 540 of FIG. 5), a non-conductive portion (e.g., the non-conductive portion 580 of FIG. 5, the non-conductive portion 680 of FIG. 6, the non-conductive portion 780 of FIG. 7, the non-conductive portion 880 of FIG. 8, or the non-conductive portion 980 of FIG. 9), and an antenna (e.g., the antenna 270 of FIG. 2, the antenna 370 of FIG. 3, the antenna 470 of FIG. 4, the antenna 570 of FIG. 5, the antenna 670 of FIG. 6, the antenna 770 of FIG. 7, the antenna 870 of FIG. 8, or the antenna 970 of FIG. 9). The second housing may be rotatably connected to the first housing. The display may be disposed on the second housing. The plurality of keyboard key caps may be disposed on at least part of the first housing. The circuit board may be disposed inside the first housing. The non-conductive portion may be disposed between some of the plurality of keyboard key caps. The non-conductive portion may be connected to the first housing. The antenna may be electrically connected to the circuit board. The antenna may be at least partially connected to the non-conductive portion. The antenna may be spaced apart from at least part of the first housing.

According to an embodiment, the electronic device may further include a communication module (e.g., the communication module 190 of FIG. 1). The communication module may be electrically connected to the antenna.

According to an embodiment, the electronic device may further include a first connection member (e.g., the first connection member 391 of FIG. 3, the first connection member 491 of FIG. 4, or the first connection member 591 of FIG. 5) and a second connection member (e.g., the second connection member 392 of FIG. 3 or the second connection member 492 of FIG. 4). The first connection member may be configured to electrically connect at least part of the antenna to the circuit board. The second connection member may be configured to electrically connect a ground of the circuit board to other part of the antenna.

According to an embodiment, at least part of the antenna may be disposed to be exposed to an outside of the first housing.

According to an embodiment, the electronic device may further include: a flexible printed circuit board (e.g., the flexible printed circuit board 360 of FIG. 3, the flexible printed circuit board 460 of FIG. 4, or the flexible printed circuit board 560 of FIG. 5), and a plate (e.g., the plate 350 of FIG. 3, the plate 450 of FIG. 4, or the plate 550 of FIG. 5). The flexible printed circuit board may be configured to provide an electrical signal for a user input received from the plurality of keyboard key caps to the circuit board. The plate may be disposed to support the flexible printed circuit board.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a conductive portion, a plurality of non-conductive portions, and a plurality of openings;
   a plurality of keyboard key caps exposed through the plurality of openings of the housing;
   an antenna, wherein at least a portion of the antenna is arranged between the plurality of keyboard key caps; and
   a circuit board disposed inside the housing and electrically connected to the antenna,
   wherein at least one of the plurality of openings are defined by the conductive portion, the plurality of the non-conductive portions, and the antenna.

2. The electronic device of claim 1,
   wherein the antenna is extended lengthwise in one direction between two key caps of the plurality of keyboard key caps, and
   wherein two non-conductive portions of the plurality of non-conductive portions are disposed at both edges of the antenna.

3. The electronic device of claim 1, wherein the antenna includes:
   a first part extending in a first direction with respect to two key caps of the plurality of keyboard key caps; and
   a second part extending in a second direction perpendicular to the first direction.

4. The electronic device of claim 1, wherein the antenna is disposed adjacent to at least two sides of one of the plurality of keyboard key caps.

5. The electronic device of claim 1, wherein the antenna includes:
   a first antenna; and
   a second antenna spaced apart from the first antenna.

6. The electronic device of claim 5, wherein at least one of the first antenna or the second antenna is disposed adjacent to a keyboard key cap for a function key input among the plurality of the keyboard key caps.

7. The electronic device of claim 5,
   wherein the first antenna is extended in a first direction, and
   wherein the second antenna includes:
      a first part extending in the first direction; and
      a second part extending from the first part in a second direction perpendicular to the first direction.

8. The electronic device of claim 7,
   wherein a plurality of second parts are provided, and
   wherein the plurality of second parts are spaced apart each other.

9. The electronic device of claim 1, further comprising:
   a first connection member configured to electrically connect at least part of the antenna to the circuit board to transmit an antenna signal; and
   a second connection member configured to electrically connect a ground of the circuit board to other part of the antenna.

10. The electronic device of claim 9, further comprising:
    a communication module disposed in the circuit board.

11. The electronic device of claim 10,
    wherein the first connection member is mounted on a first surface of the circuit board, and
    wherein the communication module is mounted on a second surface of the circuit board facing in a direction opposite to the first surface of the circuit board and located corresponding to the first connection member.

12. The electronic device of claim 9, further comprising:
    a flexible printed circuit board configured to provide an electrical signal for a user input received from the plurality of keyboard key caps to the circuit board; and
    a plate disposed to support the flexible printed circuit board.

13. The electronic device of claim 12, wherein the antenna is electrically connected to the first connection member through a hole formed in the flexible printed circuit board and a hole formed in the plate.

14. The electronic device of claim 12, wherein the second connection member is configured to contact at least part of the plate and is electrically connected to the antenna through the plate and at least part of the flexible printed circuit board electrically connected to the plate.

15. The electronic device of claim 1, further comprising:
    a coat layer disposed on an outside surface of the plurality of non-conductive portions and having a color that is substantially the same color as a color of the conductive portion.

16. An electronic device comprising:
a first housing including a conductive portion, at least one non-conductive portion disposed in the conductive portion, and a plurality of openings;
a second housing rotatably connected to the first housing;
a plurality of keyboard key caps exposed through the plurality of openings of the first housing;
an antenna disposed in the first housing, wherein at least a portion of the antenna is arranged between the plurality of keyboard key caps;
a display disposed on the second housing; and
a circuit board disposed inside the first housing and electrically connected to the antenna,
wherein the antenna is separated from the conductive portion by the at least one non-conductive portion.

17. The electronic device of claim 16, wherein the antenna is overlapped with the circuit board in a thickness direction of the first housing.

18. The electronic device of claim 16, wherein the conductive portion, the at least one non-conductive portion and the antenna are configured to form a substantially flat surface.

19. The electronic device of claim 16, wherein the at least one non-conductive portion has a loop shape surrounding the antenna.

20. The electronic device of claim 16, further comprising:
a tuning component mounted on the circuit board and configured to tune the radiation of an antenna signal through the antenna.

* * * * *